(12) United States Patent
Oh et al.

(10) Patent No.: US 9,325,828 B1
(45) Date of Patent: Apr. 26, 2016

(54) HEADSET OPERABLE WITH MOBILE TERMINAL USING SHORT RANGE COMMUNICATION

(71) Applicant: LG ELECTRONICS INC., Seoul (KR)

(72) Inventors: Sesook Oh, Seoul (KR); Jongin Lim, Seoul (KR); Samsick Kim, Seoul (KR); Kyunghye Seo, Seoul (KR); Sungjin Kang, Seoul (KR); Yoonseok Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/805,825

(22) Filed: Jul. 22, 2015

(30) Foreign Application Priority Data

Dec. 31, 2014 (KR) .................. 10-2014-0195921

(51) Int. Cl.
*H04B 1/38* (2015.01)
*H04M 1/725* (2006.01)
*H04M 1/60* (2006.01)

(52) U.S. Cl.
CPC .......... *H04M 1/7253* (2013.01); *H04M 1/6066* (2013.01); *H04M 1/72569* (2013.01)

(58) Field of Classification Search
None
See application file for complete search history.

(56) References Cited

U.S. PATENT DOCUMENTS

| | | | | |
|---|---|---|---|---|
| 2001/0053228 | A1* | 12/2001 | Jones | G10K 11/1788 381/71.6 |
| 2004/0198442 | A1* | 10/2004 | Chan | H01R 24/58 455/557 |
| 2004/0208603 | A1* | 10/2004 | Hekkel | H04B 10/1125 398/140 |
| 2008/0214247 | A1* | 9/2008 | Yang | H04M 1/6066 455/569.2 |
| 2010/0069114 | A1* | 3/2010 | Lee | H04M 1/585 455/556.1 |
| 2011/0014957 | A1* | 1/2011 | Sugimori | H04R 1/1041 455/569.1 |
| 2013/0131897 | A1* | 5/2013 | Simon | G05D 1/0816 701/14 |
| 2013/0210496 | A1* | 8/2013 | Zakarias | H04M 1/6033 455/569.1 |

* cited by examiner

*Primary Examiner* — Ashish K Thomas
(74) *Attorney, Agent, or Firm* — KED & Associates LLP

(57) ABSTRACT

A headset disclosed herein relates to a headset capable of sensing an insertion or separation of earphones, and includes a wireless communication unit provided in a body wearable on a user's body to receive a wireless signal from a connected mobile terminal, a microphone provided in the body to receive a user's voice, a plurality of earphones coupled to the body and insertable into the user's ears, respectively, and a controller configured to activate a function of controlling an operation of the mobile terminal based on the user's voice input through the microphone with connecting a call with respect to the mobile terminal, when one of the plurality of earphones inserted is separated during the call. Here, the controller may control the user's voice input through the microphone to be transferred to a counterpart terminal corresponding to the call when the one earphone is reinserted.

20 Claims, 42 Drawing Sheets

HEADSET OPERABLE WITH MOBILE TERMINAL USING SHORT RANGE COMMUNICATION

CROSS-REFERENCE TO RELATED APPLICATION(S)

Pursuant to 35 U.S.C. §119(a), this application claims the benefit of earlier filing date and right of priority to Korean Application No. 10-2014-0195921, filed in Korea on Dec. 31, 2014, the contents of which is incorporated by reference herein in its entirety.

BACKGROUND

1. Field

This specification relates to a headset operable with a mobile terminal using short range communication, and more particularly, a headset capable of sensing insertion or separation of an earphone.

2. Background

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As it becomes multifunctional, a mobile terminal can be allowed to capture still images or moving images, play music or video files, play games, receive broadcast and the like, so as to be implemented as an integrated multimedia player. This allows various contents to be viewed using the mobile terminal, and additionally the demand on a headset using short range communication (referred to as a wireless headset) is increasing.

Among various short range wireless communications, BLUETOOTH is the standard for implementing wireless communication between wireless communication devices in a short range with low energy, and processes information transmission among computers, mobile phones, headsets, personal digital assistants (PDAs), personal computers (PCs) and printers. Typically, BLUETOOTH is the telecommunications technology that can wirelessly transmit and receive data in a range from ten meters to hundreds of meters as the maximum limit. The data transmission rate of BLUETOOTH is 433.9 kbps in a symmetric communication mode and 723.2 kbps in a non-symmetric communication mode. A synchronous transmission system of 64 kbps is used when transmitting voice. Further, BLUETOOTH processes wireless access of a wireless headset, a wireless keyboard, PDA, a notebook, a camera and a mobile terminal to a peripheral device and a query facility via mobile communication.

For example, a headset is a device which is connected to a mobile terminal via BLUETOOTH to transfer an audio signal output from the mobile terminal to both ears, and may have a structure including an earphone and a microphone. The headset serves to output the audio signal, which is output from the mobile terminal, through an audio output module provided in the earphone and transfer a voice signal to the mobile terminal through the microphone provided at one side thereof during a call.

In the meantime, from the perspective of the structural feature of the headset which is operable with the mobile terminal using the short range wireless communications, the headset can limitedly control the operation of a connected mobile terminal. That is, the related art headset usually performs only an output of the audio signal or an input of the voice signal, failing to allow for various functions associated with the operation of the connected mobile terminal for user convenience.

SUMMARY OF THE DISCLOSURE

Therefore, an aspect of the detailed description is to provide a headset, capable of inputting a control command for controlling an operation of a mobile terminal in a novel manner during a call with a counterpart (or another party) using a headset which is operable with the mobile terminal through short range wireless communication.

Another aspect of the detailed description is to provide a headset, capable of controlling an operation of a mobile terminal and immediately receiving a control result based on a user's voice, with keeping connecting a call with a counterpart.

To achieve these and other advantages and in accordance with the purpose of this specification, as embodied and broadly described herein, there is provided a headset including a body wearable on a user's body, a wireless communication unit provided in the body and configured to receive a wireless signal from a connected mobile terminal, a microphone provided in the body and configured to receive a user's voice, a plurality of earphones coupled to the body and insertable into the user's ears, respectively, and a controller configured to activate a function of controlling an operation of the mobile terminal based on the user's voice input through the microphone with connecting a call with respect to the mobile terminal, when one of the plurality of earphones inserted is separated during the call. The controller may switch the user's voice input through the microphone to be transferred to a counterpart terminal corresponding to the call when the one earphone is reinserted. This may allow the user to use the headset so as to be provided with desired information from a mobile terminal using a voice command while performing a call with a counterpart.

In accordance with another aspect to achieve the objectives and others of the present invention, a headset may include a body wearable on a user's body, a wireless communication unit provided in the body and configured to receive a wireless signal from a connected mobile terminal, a microphone provided in the body and configured to receive a user's voice, a plurality of earphones coupled to the body and insertable into the user's ears, respectively, and a controller configured to, when a preset input is applied to one of the plurality of earphones inserted in case where another call is received while a previous call with respect to the mobile terminal is connected, control information related to the another call to be output through at least one of the plurality of earphones with maintaining the connection of the previous call. The controller may maintain the connection of one of the previous call and the another call and disconnect the other when one of the one earphone with the preset input applied thereto and the other earphone is separated. This may allow the user to use the headset so as to process a connection of a previous call and another call in a simple manner by applying a predetermined pressure to earphones when the another call is received while the previous call of a counterpart is connected.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

Embodiments will be described in detail with reference to the following drawings in which like reference numerals refer to like elements and wherein:

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 1 is a block diagram of one example of a headset operable with a mobile terminal through short range wireless communication;

FIG. 2 is a perspective view of the one example of the headset illustrated in FIG. 1;

FIG. 3 is a view illustrating a state that a headset and a mobile terminal are connected to each other through short range wireless communication in accordance with the present invention;

FIGS. 4A and 4B are conceptual views of a communication system operable with a mobile terminal connected with a headset in accordance with the present invention;

FIG. 5 is a flowchart representatively illustrating a method for controlling an operation of a mobile terminal during a call, using a headset in accordance with the present invention;

FIGS. 6A to 6E are conceptual views illustrating the flowchart of FIG. 5;

FIGS. 7A to 7D are conceptual views illustrating a method of connecting or refusing a call using a headset in accordance with the present invention;

FIGS. 8A to 8D are conceptual views illustrating a method for providing an operation result of a mobile terminal to a counterpart terminal, with which a call is currently connected, using an input applied to a headset in accordance with the present invention;

FIGS. 9A and 9B are conceptual views illustrating a method of adjusting an output speed of an operation result of a mobile terminal, based on an input applied to a headset in accordance with the present invention;

FIGS. 10A to 10C are conceptual views illustrating a method of correcting a control command for operating a mobile terminal based on an input applied to a headset in accordance with the present invention;

FIGS. 11A to 11C are conceptual views illustrating a method of re-hearing an operation result of a mobile terminal based on an input applied to a headset in accordance with the present invention;

Figure 13:
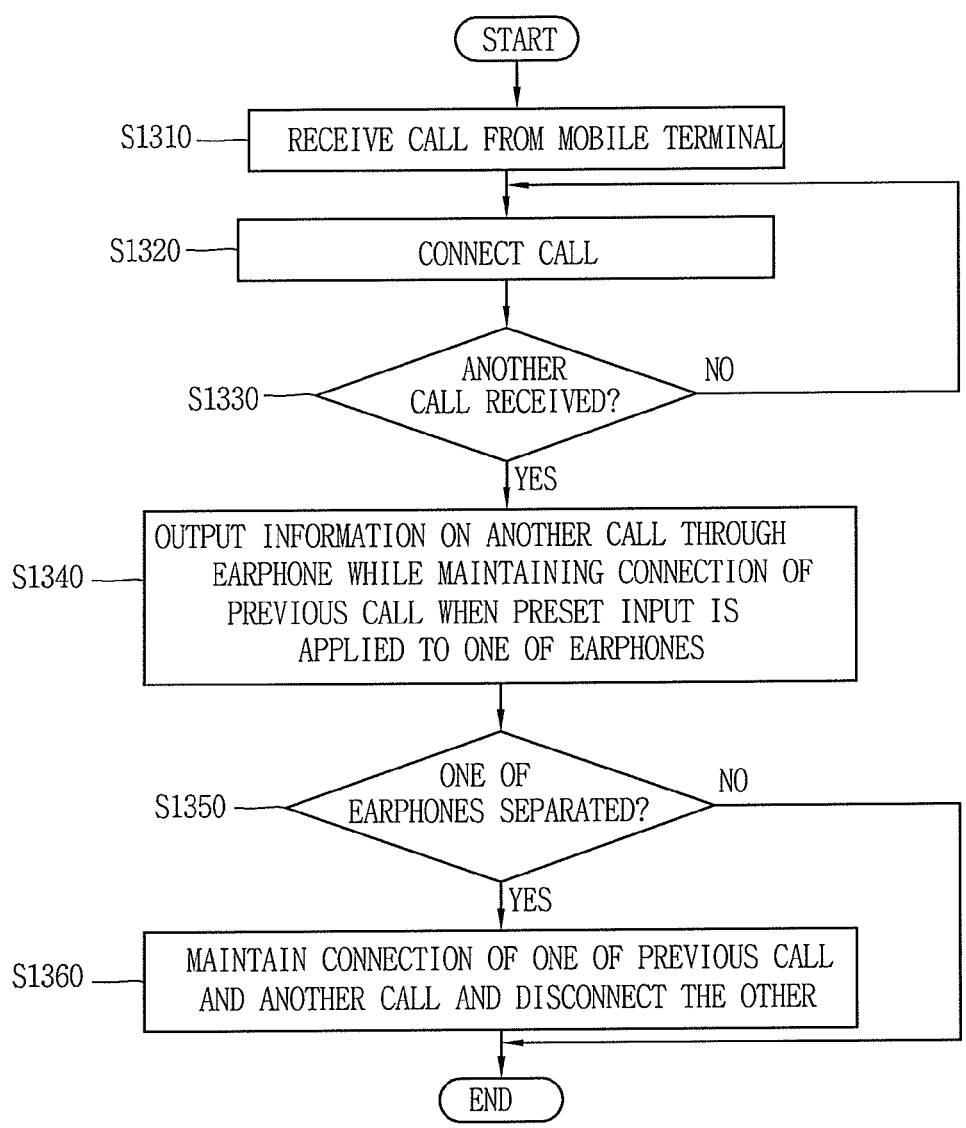
Figure 15A:
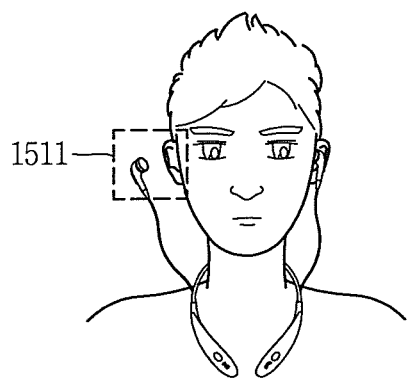
Figure 15B:
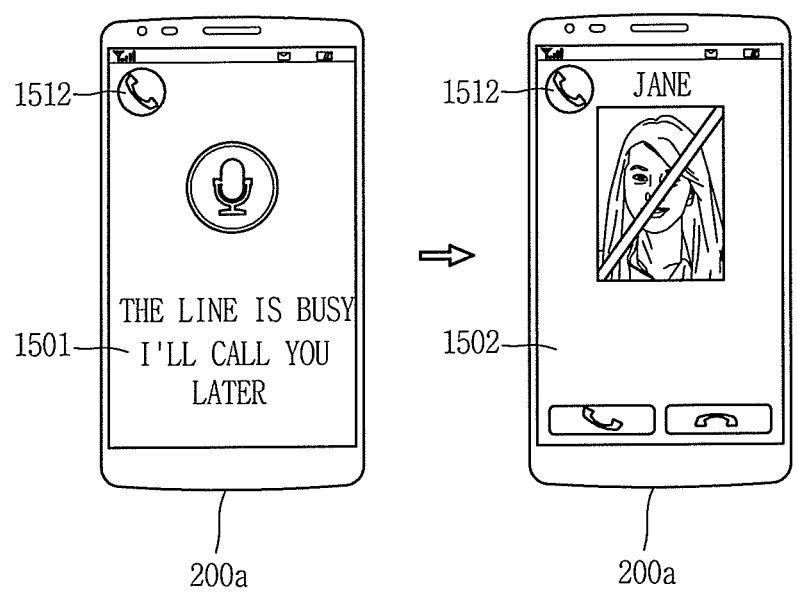
Figure 15C:
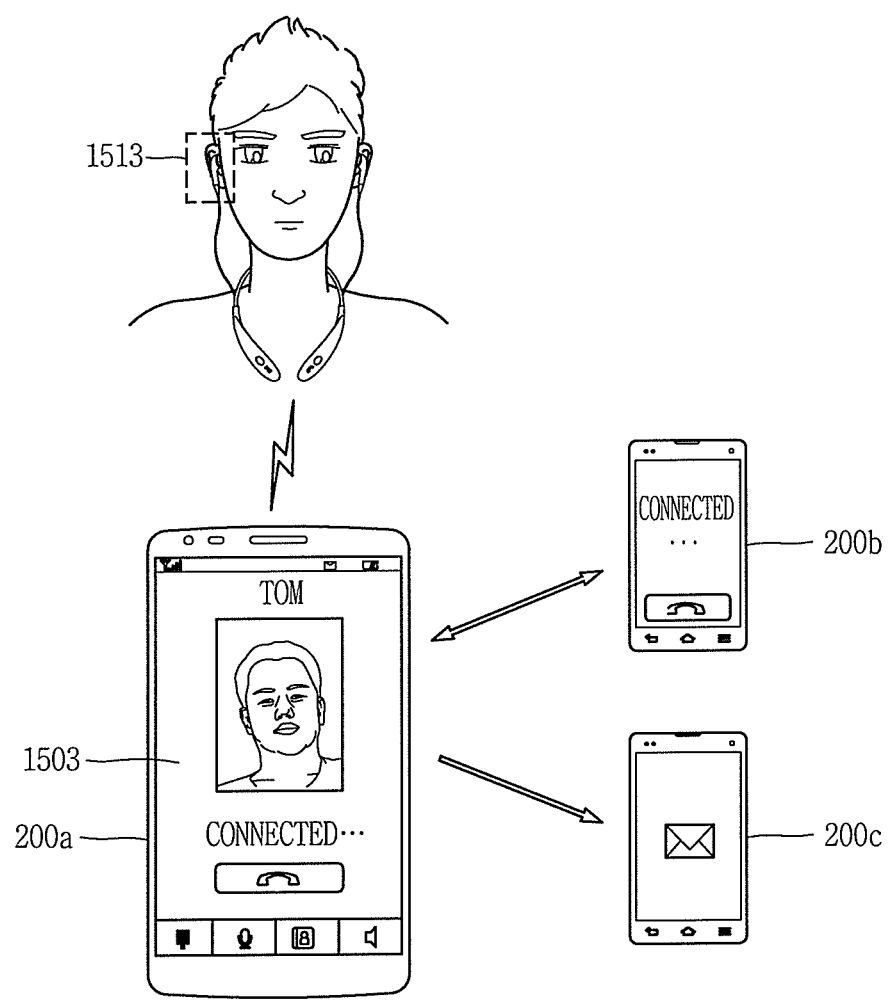
Figure 16A:
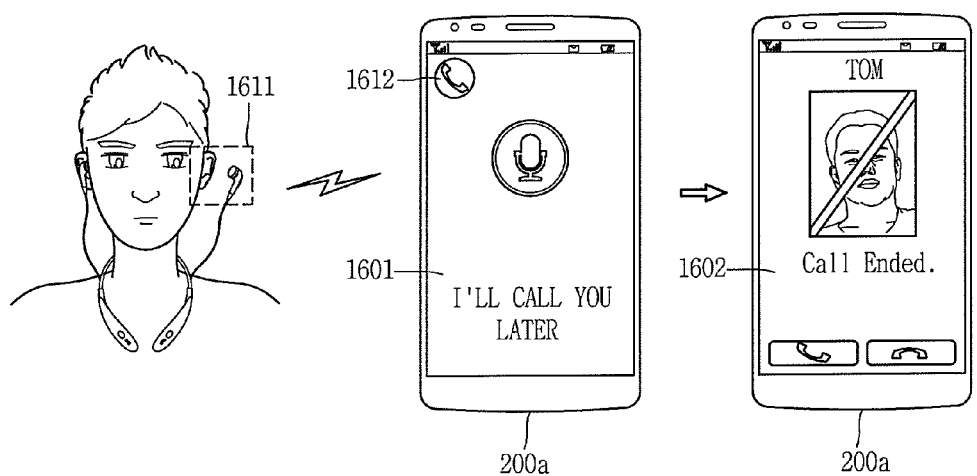
Figure 16B:
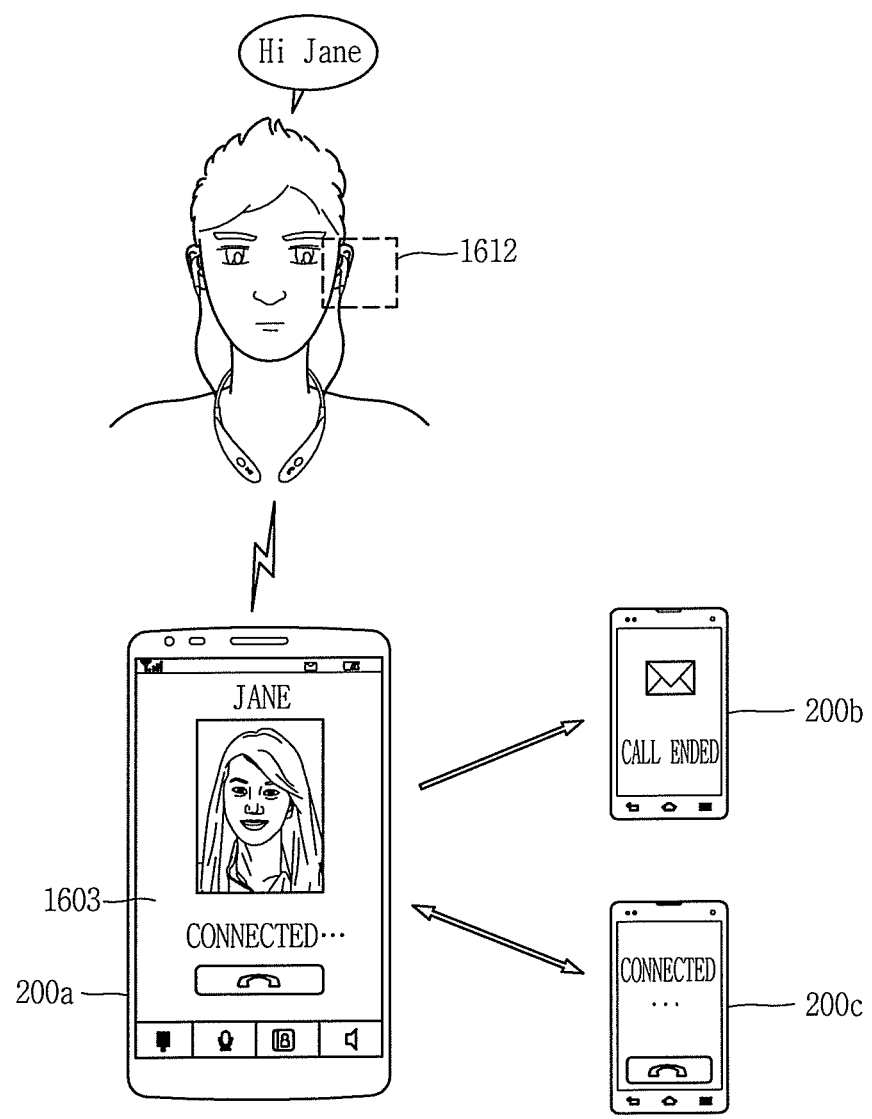
Figure 17A:
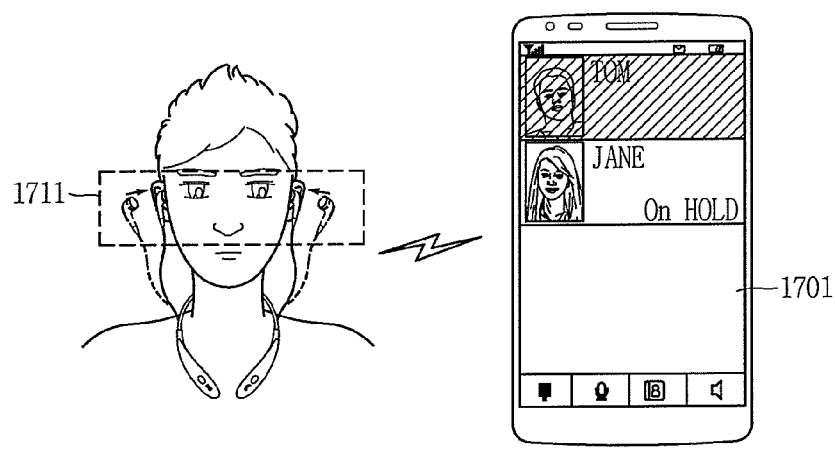
Figure 17B:
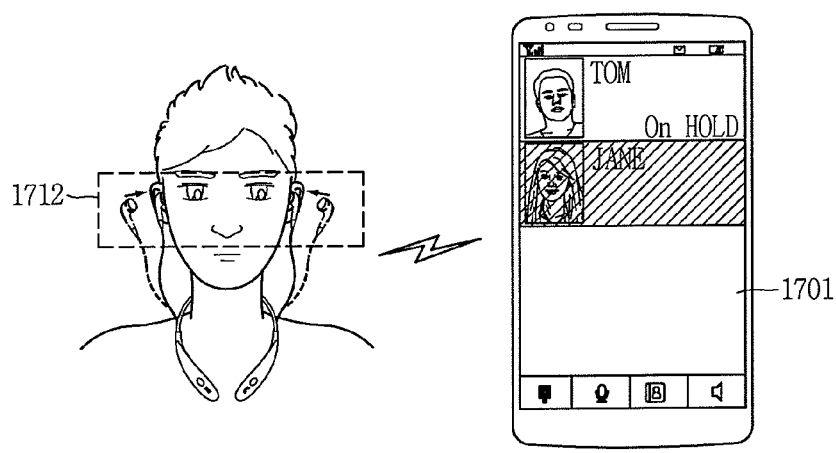
Figure 18A:
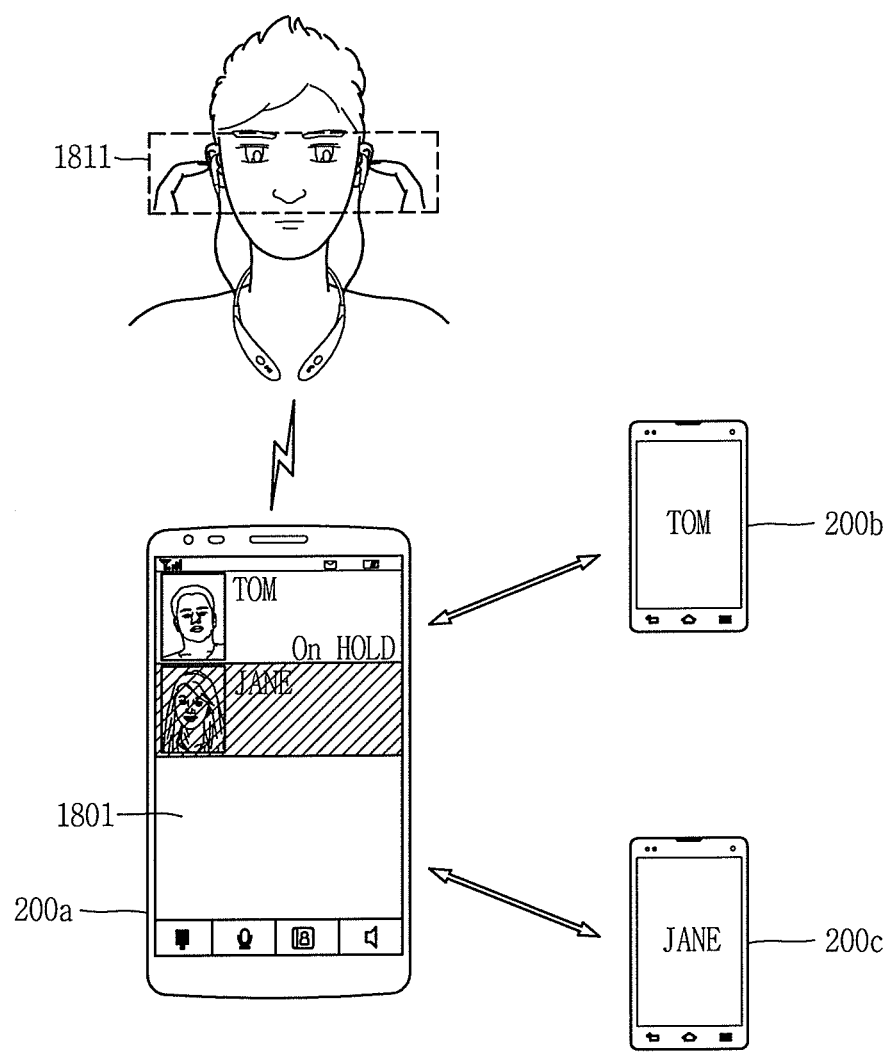
Figure 18B:
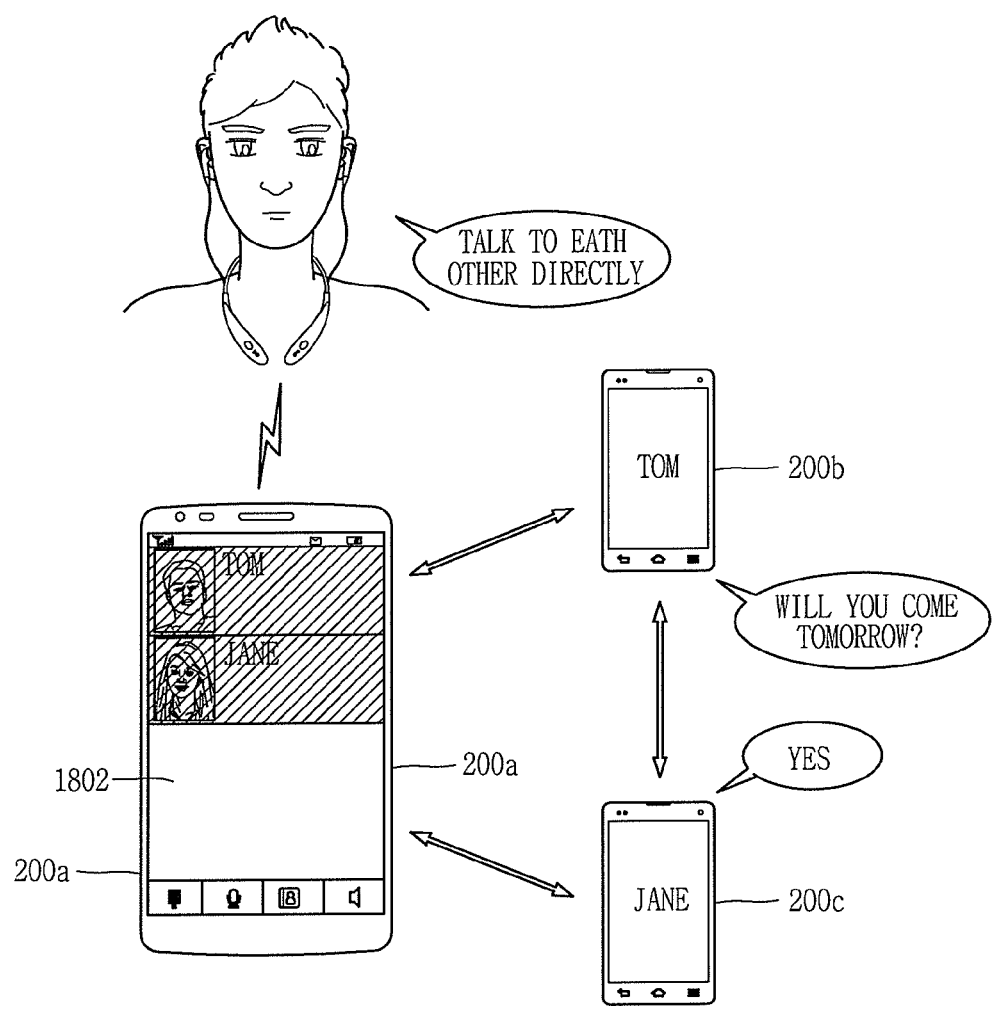
Figure 19A:
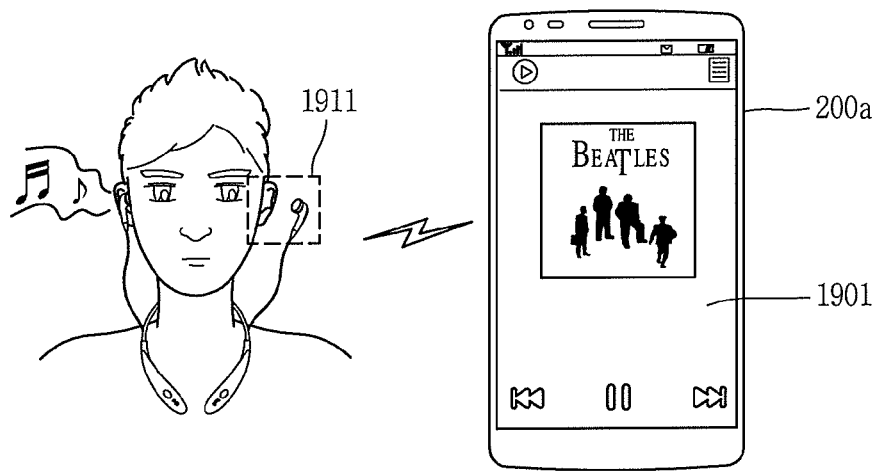
Figure 19B:
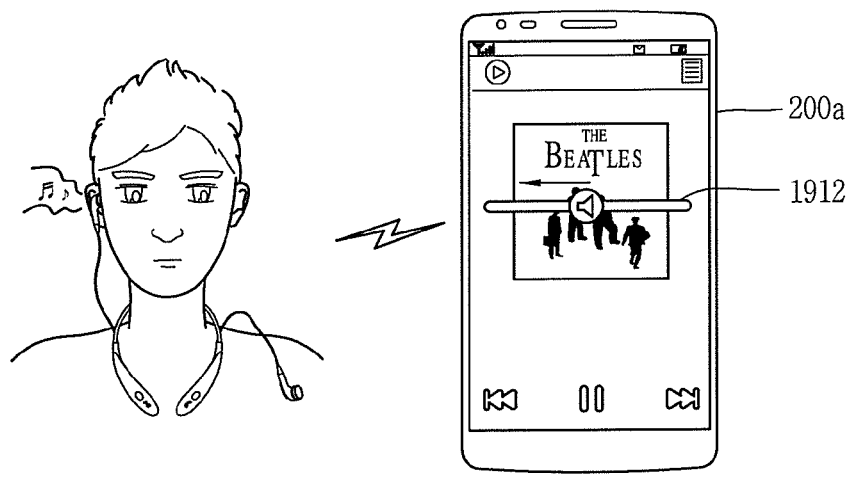
Figure 19C:
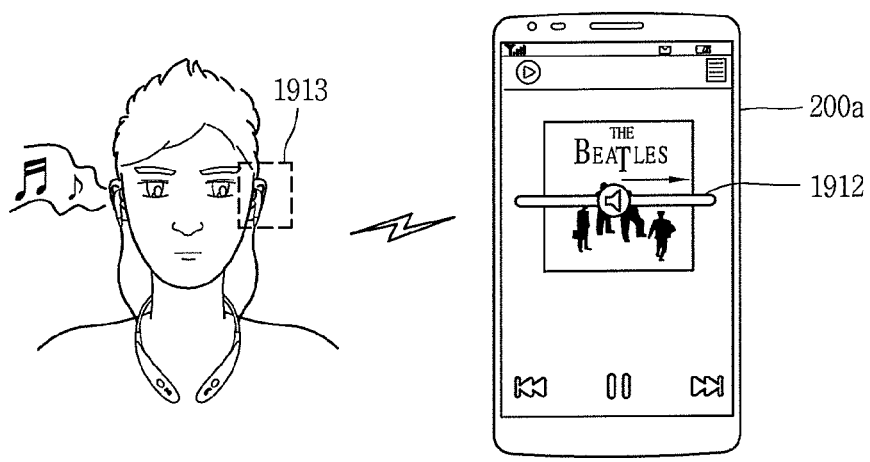
Figure 20A:
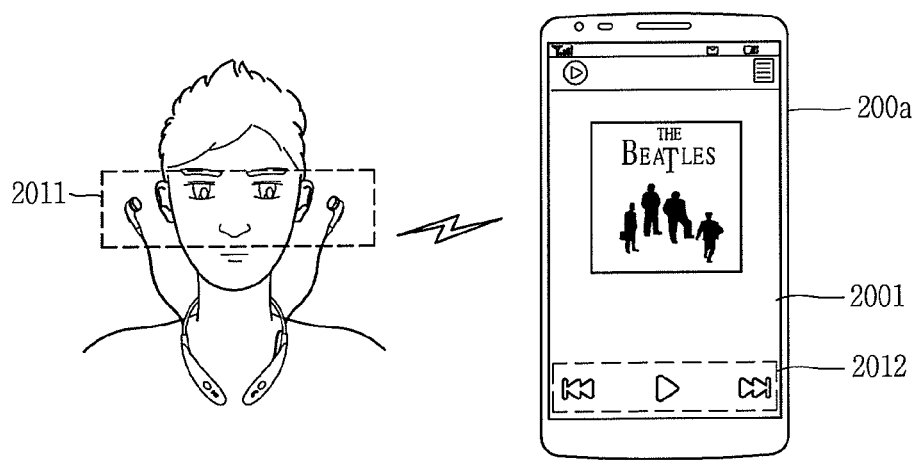
Figure 20B:
Figure 20C:
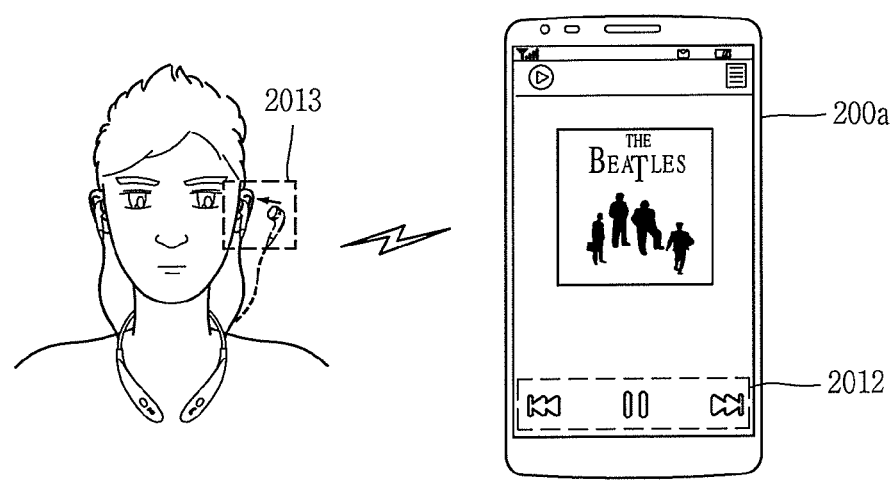
Figure 21A:
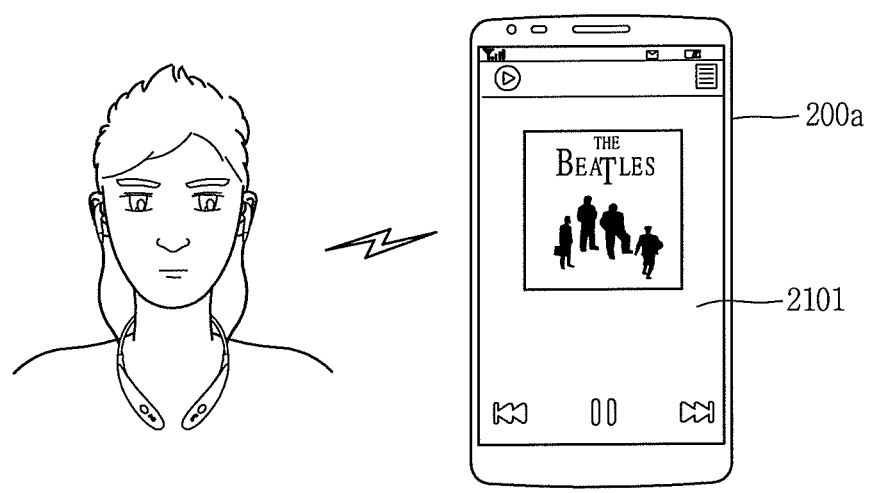
Figure 21B:
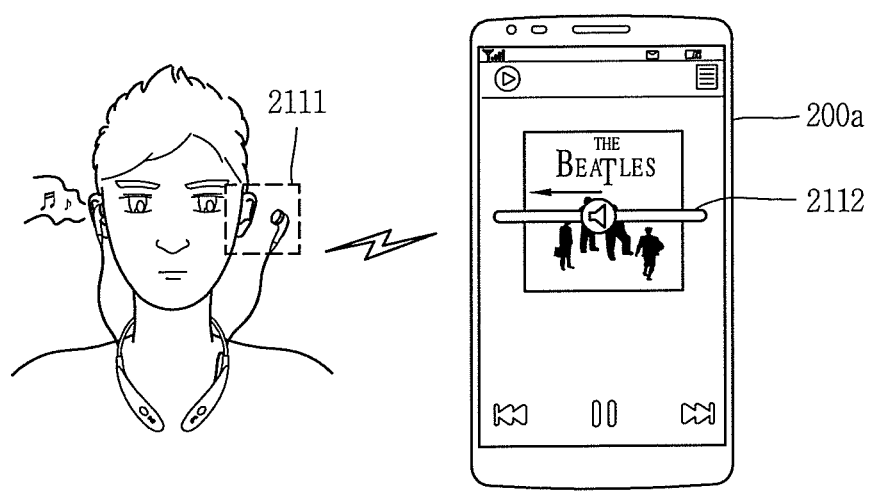
Figure 21C:
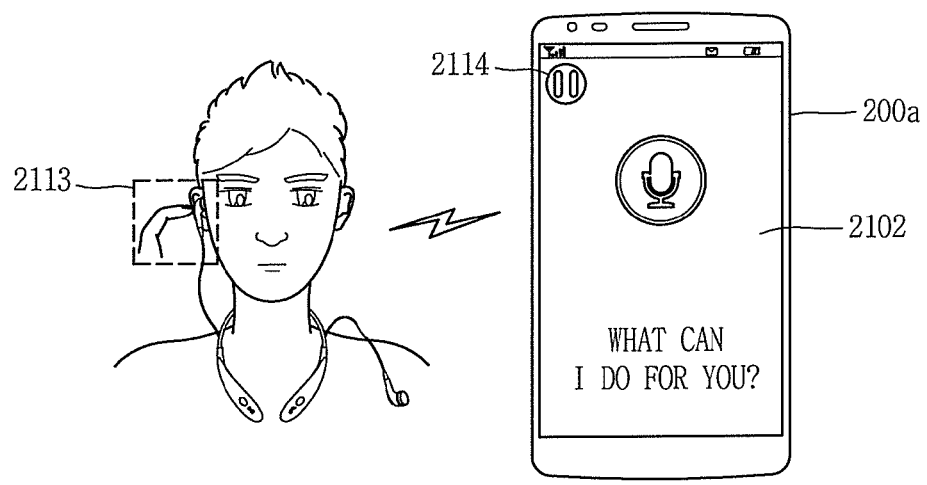

FIGS. 12A to 12E are conceptual views illustrating a method of controlling an operation of a mobile terminal based on voice of a counterpart during a call conversation, based on an input applied to a headset in accordance with the present invention;

FIG. 13 is a flowchart illustrating a method of processing another incoming call signal received during a call, using a headset in accordance with the present invention;

FIGS. 14A to 14D are conceptual views illustrating the flowchart of FIG. 13;

FIGS. 15A to 15C are conceptual views illustrating a method of refusing another incoming call signal received during a call, using a headset in accordance with the present invention;

FIGS. 16A and 16B are conceptual views illustrating a method of connecting another incoming call signal received during a call and ending (disconnecting) a previous call, using a headset in accordance with the present invention;

FIGS. 17A and 17B are conceptual views illustrating a method of performing a previous call and another incoming call in an alternating manner, using a headset in accordance with the present invention;

FIGS. 18A and 18B are conceptual views illustrating a method of performing a multiparty call using a headset in accordance with the present invention;

FIGS. 19A to 19C are conceptual views exemplarily illustrating a method of automatically controlling an audio signal of a currently-reproduced content, based on an insertion or separation of earphones coupled to a headset in accordance with the present invention;

FIGS. 20A to 20C are conceptual views exemplarily illustrating a method of controlling an operation of a content in a step-by-step manner, based on an insertion or separation of earphones coupled to a headset in accordance with the present invention; and FIGS. 21A to 21C are conceptual views illustrating a method of controlling an operation of a mobile terminal during a content reproduction using a headset in accordance with the present invention.

DETAILED DESCRIPTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

In this application, the terms "comprising" and "including" should not be construed to necessarily include all of the features, numbers, steps, operations, constituting elements, components or combinations thereof disclosed herein, and should be construed not to include some of the elements or steps thereof, or should be construed to further include additional elements or steps.

Figure 1:
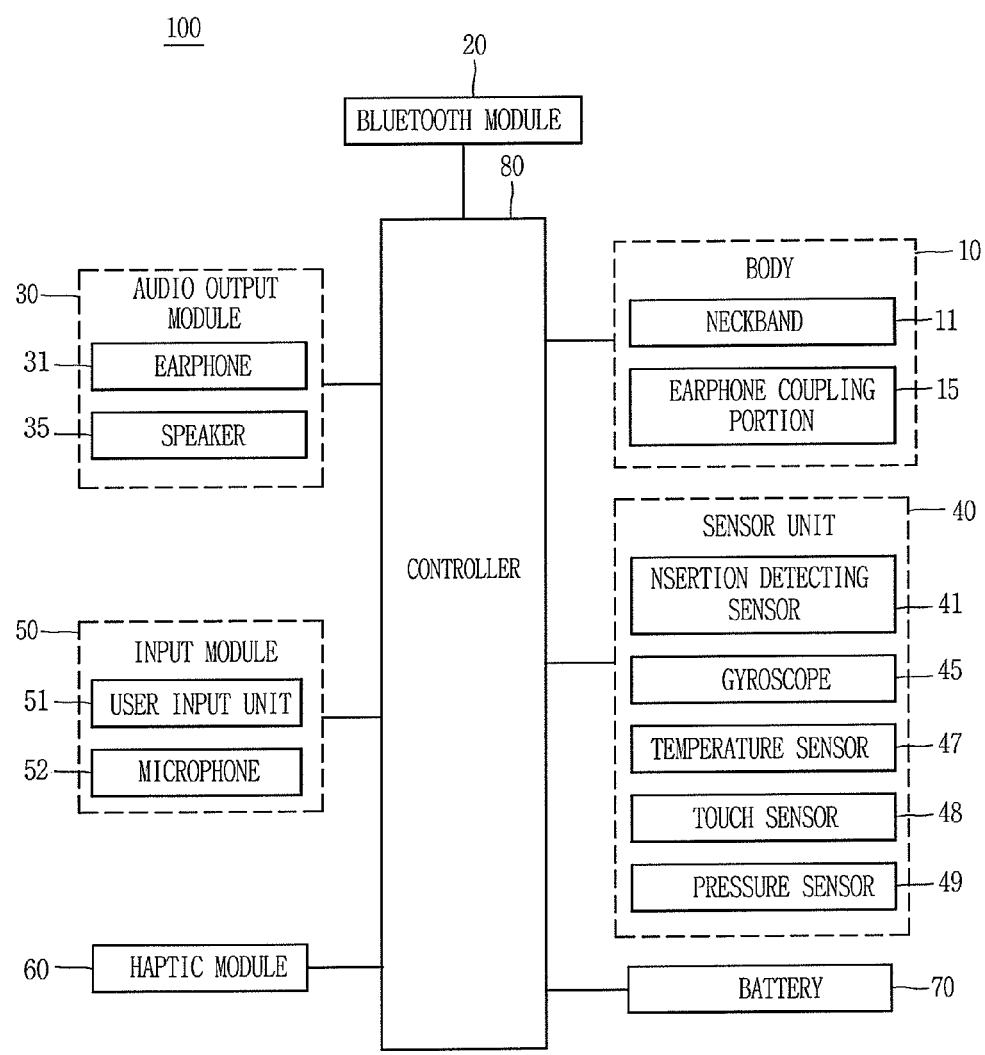
Figure 2:
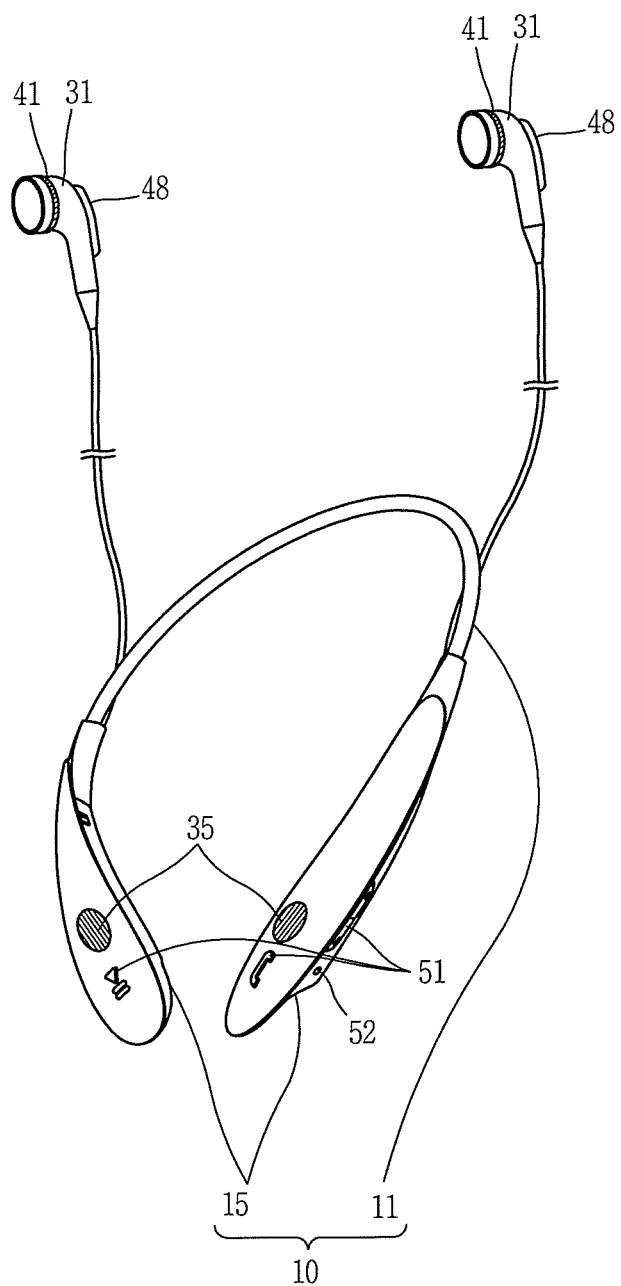

Hereinafter, FIG. 1 is a block diagram of one example of a headset in accordance with the present invention, and FIG. 2 is a perspective view of the one example of the headset illustrated in FIG. 1.

As illustrated in FIG. 1, a headset 100 according to the present invention may include a BLUETOOTH module 20, an audio output module 30 having an earphone 31 and a speaker 35, an input module 50 including a sensor unit 40, a user input unit 51 and a microphone 52, a haptic module 60, a battery 70, and a controller 180.

A body 10 is wearable on a user's body and includes an earphone coupling portion 15. The body 10 may include a neckband 11 wearable on the user's neck. The neckband 11, as illustrated in FIG. 2, is a member in a shape like an alphabet C, and may include the earphone coupling portion 15 provided on at least one end portion thereof.

The earphone coupling portion 15 may be formed on at least one side of the body 10, for example, on both end portions of the body 10. A portion of a unit inserted into a user's ear is coupled to the earphone coupling portion 15. The earphone coupling portion 15 may be implemented in an inserting manner, or, for easy mounting, in a manner of using a magnetic force by providing a magnet to at least one of the earphone 31 and the earphone coupling portion 15.

The BLUETOOTH module 20 is the part for short range wireless communication with a mobile terminal connected to the headset 100, and is the standard for a short range wireless technology. The Bluetooth module 20 is usually used when low energy wireless connectivity is required in a short range of about 10 m and performs transmission and reception of signals via wireless communication, such that signals can be exchanged in a predetermined distance, with no inconvenient cables.

The BLUETOOTH uses 2400~2483.5 MHz that is Industrial Scientific and Medical (ISM) frequency band. The BLUETOOTH uses total 79 channels including 2 MHz after 2400 MHz, 2402~2480 MHz except a range to 3.5 MHz before 2483.5 MHz, to prevent interruption in other systems using higher and lower frequencies. The BLUETOOTH uses the same frequency band together with various systems and is likely to cause radio frequency inference among systems. To prevent such radio frequency interference, the BLUETOOTH adapts a frequency hopping method that transmits a packet (data) gradually, while moving many channels according to a predetermined pattern.

The BLUETOOTH module 20 is coupled to a mobile terminal to receive an audio signal from the mobile terminal and outputs sound via the audio output module 30. The audio output module 30 may include the earphone 31 inserted into the user's ear to enable only the user to hear sounds, and the speaker 35 spaced apart a predetermined distance from the user's ear and configured to output sounds to even outside.

The BLUETOOTH module 20 is one example of short-range wireless communication, and also be replaced with another short-range wireless communication module. For example, the headset 100 and at least one mobile terminal 200 may be connected to each other by using a short-range wireless communication module which uses one of radio frequency identification (RFID), infrared data association (IrDA), ultra wideband (UWB), ZigBee, near field communication (NFC), Wi-Fi, Wi-Fi direct, and wireless universal serial bus (USB).

The earphone 31 may be configured to be inserted in one of both ears of the user or provided as a pair to be inserted into both ears of the user. The earphone 31 is connected to the body 10 via a wire to receive an audio signal via the wire and outputs sounds. A unit is provided at an end portion of the wire to be inserted into the user's ear so as to output sounds. The unit is coupled to the earphone coupling portion 15 of the body 10.

The earphone 31 enables only the user to hear the sounds, without disturbing other people by noises, and prevents a third person from eavesdropping on a telephone conversation. However, the user may have trouble hearing outside sounds. To this end, the speaker 35 as well as the earphone 31 is further provided such that the user can hear the music or talk on the phone by selecting one of the earphone 31 or the speaker 35.

The speaker 35, as illustrated in FIG. 2, may be provided on one side or both sides of the body 10. When the speaker 35 is provided on only one side of the body, the speaker 35 is preferably provided at a position opposite to the microphone 55.

An audio hole provided in the speaker 35 may be formed as close to the user's ear as possible to make the user hear the sounds with no loss of the sounds and to minimize the disturbance to the surroundings. As illustrated in FIG. 2, the audio hole formed in the body 10 including the C-shaped neckband 11 according to the BLUETOOTH headset 100 may be formed to face upward when the user wears the neckband 11.

The audio hole may include a mesh having a plurality of micro holes formed therein to prevent internal parts from being seen outside. An audio module may further be formed adjacent to the audio hole or spaced apart from the audio hole.

The audio hole may further include a waveguide provided therein, with a taper shape having a cross section getting larger toward the audio hole. The waveguide is a pipe-shaped member so that a sound wave or an electromagnetic wave can pass through. When the waveguide is formed in the taper shape having the cross section getting larger toward the audio hole, the sound can be amplified.

The waveguide may be formed long in a conical or spiral shape to more amplify the sound. Or, curved projections can be formed on a wall surface of the waveguide. The projections can minimize sound distortion and reduce noises from the sounds. Or, the waveguide may also be configured to have two divided passages to output sounds therethrough, respectively.

As aforementioned, the audio hole of the speaker 35 is preferably arranged adjacent to the user's ear. However, the audio hole may be formed downward, when right and left portions are reversed by the user's wearing the BLUETOOTH headset in the reverse. In this instance, the speaker 35 may be rotated to position the audio hole upward again, thereby providing user convenience.

The rotation of the speaker 35 can be manually performed by the user. Alternatively, a gyroscope 45 can sense a state of the body 10. When the audio hole is pointing downward based on the sensed state of the body 10, the speaker 35 can be automatically rotated to position the audio hole upward.

Or, audio holes may be formed in upper and lower portions, respectively, when wearing the neckband 11 on the neck, and covers may be provided on the audio holes, respectively. When the covers are provided, one cover can open the audio hole positioned at the upper portion and the other cover can close the other audio hole positioned at the lower portion, such that the upper audio hole can be controlled to always be open, regardless of the direction in which the user wears the headset 100.

The sensor unit 40 may also include an insertion detecting sensor 41 and the gyroscope 45. The insertion detecting sensor 41 is a sensor which senses whether or not the earphone 31 has been inserted into the user's ear. At least one of a temperature sensor 47, a touch sensor 48, a pressure sensor 49, an illumination sensor, and a proximity sensor can be used as the insertion detecting sensor 41. When the earphone 31 is configured as a pair, the insertion detecting sensor 41 may be provided on each earphone so as to determine whether the user's ear with the earphone inserted is left or left. In this instance, a sensor value obtained by each insertion detecting sensor 41 may be transferred to the controller 80. Accordingly, the controller 80 may control different functions/operations to be performed by recognizing an inserted order of each earphone, an inserted time, a removed order, a removed time and the like.

The temperature sensor 47 senses temperature of an inner surface of the earphone 31. When the earphone 31 is inserted into the user's ear, the temperature of the earphone 31 increases by the user's body temperature (35 to 37°). When a sensed temperature reaches the body temperature and this state is maintained for a predetermined time, it can be determined that the earphone 31 has been inserted into the user's ear.

The touch sensor 48 senses the user's gripping the earphone 31 with a hand to insert the earphone 31 into the ear. The touch sensor 48 may be used together with the illumination sensor. Accordingly, when a touch is applied to the earphone 31, the touch sensor 48 may sense whether the earphone 31 is inserted into or separated (removed) from the user's ear, by taking into account changes of illumination values, which are sensed by the illumination sensor before and after the touch.

The pressure sensor 49 senses pressure. When a specific portion of the earphone 31 is pressed with the earphone 31 being inserted into the user's ear, the pressure may be sensed to determine whether or not the earphone 31 has been inserted into the user's ear.

The proximity sensor whether an object approaches based on an infrared ray returning after collided with the object from an infrared ray sensor. When the proximity sensor is provided in the earphone 31, the proximity sensor senses that the earphone 31 is getting close to or away from the user's ear.

The gyroscope 45 is configured to read angle changes generated in up/down, right/left and back/forth directions so as to notify velocity and location of a movable object. After a micro vibration structure is fabricated on a silicon wafer, the gyroscope 45 senses the velocity and location of the movable object by sensing angular displacement generated by rotation in a state of driving the vibration structure.

The gyroscope 45 is provided on the body 10 to sense a state of the body 10. For example, the gyroscope 45 senses whether one portion of the body 10 is positioned at a right portion and the other portion thereof is positioned at a left portion when the user wears the neckband 11 on the neck, or whether one portion of the body 10 is positioned at the left portion and the other portion is positioned at the right portion when the user wears it in the reverse direction.

The gyroscope 45 may also be provided in the earphone 31. In this instance, it is sensed whether the earphone 31 is removed away from the user's ear. Alternatively, the gyroscope 45 may cooperate with the gyroscope 45 provided in the body to compare their positions with each other, so as to sense whether the earphone 31 is located higher or lower than the body 10.

Also, an earphone coupling detecting sensor may be provided in the earphone coupling portion 15, which is disposed on at least one side, for example, both end portions of the body 10. The earphone coupling detecting sensor may sense whether or not the earphone 31 is coupled to the earphone coupling portion 15. To this end, at least one of a hall IC, a static pressure sensor, a capacity sensor, a magnetic sensor and a proximity sensor can be used as the earphone coupling detecting sensor.

The hall IC is configured to sense a change in a magnetic field. When the earphone 31 is coupled to the earphone coupling portion 15 by a magnetic force, the hall IC is switched on. When the earphone 31 is separated from the earphone coupling portion 15, the hall IC is switched off. Accordingly, the hall IC can sense whether the earphone 31 is coupled to the earphone coupling portion 15 or not.

The capacity sensor is configured to sense a change in the capacity of a capacitor. When the capacity of the capacity sensor changes, the capacity sensor determines that the earphone 31 has been coupled to or separated from the earphone coupling portion 15.

When the proximity sensor is provided in the earphone coupling portion 15, whether or not the earphone 31 is coupled may be determined based on whether the earphone 31 approaches the earphone coupling portion 15 or gets away from it.

In this manner, it can be determined whether the user wants to hear sounds through the earphone 31 or the speaker 35 according to whether or not the earphone 31 has been coupled to the earphone coupling portion 15. At least one of the insertion detecting sensor 41, the gyroscope 45, the temperature sensor 47, the touch sensor 48, the pressure sensor 49, the illumination sensor and the proximity sensor can be provided in the earphone 31, so as to sense whether the earphone 31 has been inserted into the user's ear, an inserted order and time into both of the ears, whether the earphone 31 has been separated from the user's ear, a separated order and time from both of the ears, and the like. Accordingly, such sensor can differently recognize motions, such as the user inserting or separating the earphone 31, gripping or falling the separated earphone 31, completely separating the earphone 31, and the like, which may allow for executing different operations accordingly.

Meanwhile, when the motion of inserting/separating the earphones 31 to/from the user's ears is performed within a preset time (several seconds), it may be recognized as the earphones 31 being simultaneously inserted or separated even with a slight time difference. On the other hand, when the motion of inserting/separating the earphones 31 is not performed within the preset time (several seconds), it may be recognized as the user deliberately removing only one earphone, thereby performing a corresponding function or operation.

The input module 50 is a device for inputting the user's command or voice and may include a user input unit 51 and a microphone 52.

The user input unit 51 may be provided on each of the body 10 and the earphone 31. The user input unit 51 provided on the body 10, for example, may include a key for controlling a call connection when a connected mobile terminal receives an incoming call, a key for adjusting volume, a key for controlling music playback, and the like.

The user input units 51 may be symmetrically provided on both sides of the body 10 having the neck band 11 wearable on the user's neck. Here, when right and left portions of the neck band 11 are reversed after the user wears the neckband 11 in a wrong direction, the right and left functions can be automatically switched over.

For example, the button for call connection is positioned at one side and the button for music playback is positioned at the other side. In this instance, the functions of the user input units 51 may be switched over to always position the music playback button at the right side and the call button at the left side, regardless of the user's wearing the neckband in a forward or reverse direction. As mentioned above, the gyroscope 45 can sense whether the body 10 is worn in the forward direction or the reverse direction.

Also, the user input unit 51 provided on the earphone 31 may include a touch sensor 48 to sense a touch input applied in various manners to input a predetermined control command. The touch sensor 48 may be provided at the other side of a unit at which the earphone 31 is inserted into the user's ear, such that the user can conveniently apply a touch while inserting the earphone 31 in the ear. Here, a region of the earphone 31 provided with the touch sensor 48 may have a protrusion structure, a pattern, a color and the like to be distinctive from the other region. In this instance, the left and right earphones 31 can have different protrusion structures, patterns, colors and the like for facilitating the user's distinction.

The touch sensor 48 may be a type of a touch film, a touch sheet, a touch pad and the like, for example. Also, the touch sensor 48 may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure.

Accordingly, when a touch input is applied while the earphone 31 is inserted into the user's ear, the touch sensor 48 may sense the touch input and the controller 80 may generate a control command corresponding to the sensed touch input. A different control command may be executed according to a method of applying a touch input to the touch sensor 48 of the earphone 31. Also, even when the same type of touch input is applied to the earphone 31, different control commands may be executed according to whether the earphone 31 is inserted in or separated from the user's ear.

The microphone 52 may be configured to input a voice with respect to or record a call received in the connected mobile terminal. The microphone 52 may be provided adjacent to the user's mouth, and as illustrated in the embodiment of FIG. 2, located at one end portion of the body 10.

Here, as illustrated in FIG. 2, when one of the speakers 35 is adjacent to the microphone 52, the speaker 35 located adjacent to the microphone 52 may be controlled not to operate and only the other speaker 35 located in opposite may be controlled to operate, such that sounds output through the speaker 35 cannot be input back into the microphone 52.

The battery 70 is provided in the body 10 and supplies the power to operate each of the components of the headset 100. A rechargeable secondary cell may be used as the battery 70 and the battery may be a detachable type or mountable type.

The haptic module 60 may be provided in the body 10 and vibrate the body 10 to perform a notification function to the user. For example, when the notification function is performed in response to an event generation from the connected mobile terminal, such as the connected mobile terminal receiving a call or a message, the haptic module 60 may allow the user to recognize the notification even without viewing the mobile terminal.

The controller 180 controls an overall operation of each component of the headset 100 by power supplied from the battery 70.

The controller 80 transfers an audio signal received through the BLUETOOTH module 20 to the speaker 35 or the earphone 31 such that sounds can be output therethrough. Also, the controller 80 may control the BLUETOOTH mobile 20 to transmit a control command input through the user input unit 51, 48 to the mobile terminal or sound information input through the microphone 52 to the mobile terminal.

Figure 3:
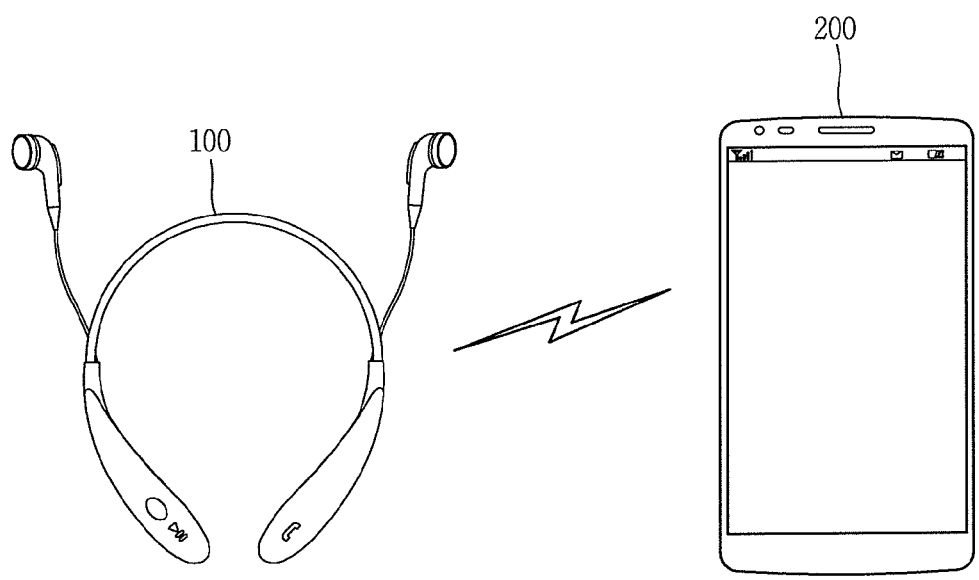

FIG. 3 is a view illustrating a state that a headset and a mobile terminal 200 are connected to each other through short range wireless communication in accordance with the present invention. As illustrated in FIG. 3, the headset 100 may be connected to the mobile terminal 200 to perform transmission and reception of wireless signals through BLUETOOTH communication.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

The mobile terminal 200 may sense a headset 100 and the like, which are adjacent thereto and can communicate therewith using a short-range communication module. When the sensed headset 100 is an authenticated device to communicate with the mobile terminal 200, the mobile terminal 200 may transmit at least part of data processed therein to the headset 100. Therefore, the user of the headset 100 can use the data processed in the mobile terminal 200 through the headset 100. For example, when the mobile terminal 200 receives a call, the user may answer the incoming call through the headset 100. Or, the user can listen to the music, which is currently played in the mobile terminal 200, through the headset 100.

Also, the headset 100 and the mobile terminal 200 may automatically perform an authentication process and a pairing process when the headset 100 is worn on a part of the user's body, for example, on the user's neck. For example, when the mobile terminal 200 inquires adjacent external devices which can communicate therewith and senses the headset 100 worn around the user's body, among other devices, the mobile terminal 200 may automatically perform pairing and paging with the headset 100, so as to enable BLUETOOTH communication with the headset 100.

Figure 4A:
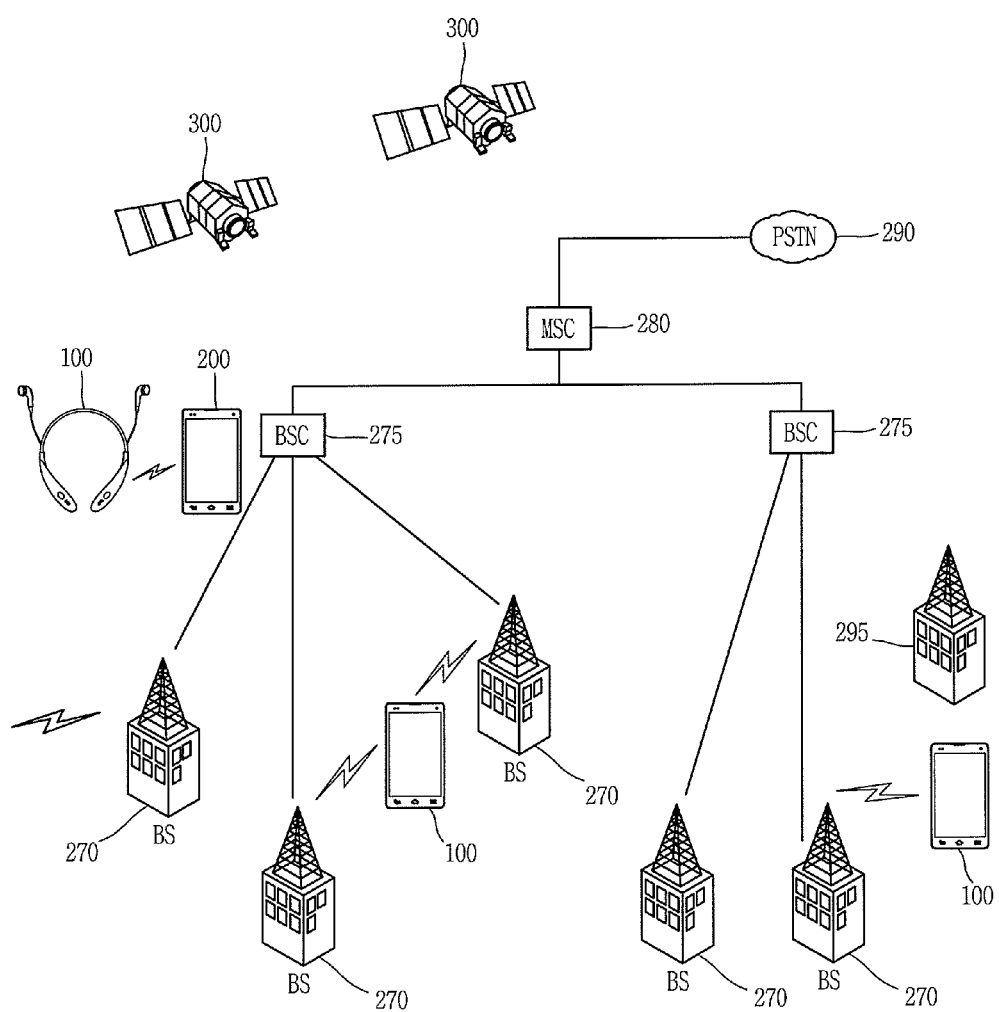
Figure 4B:
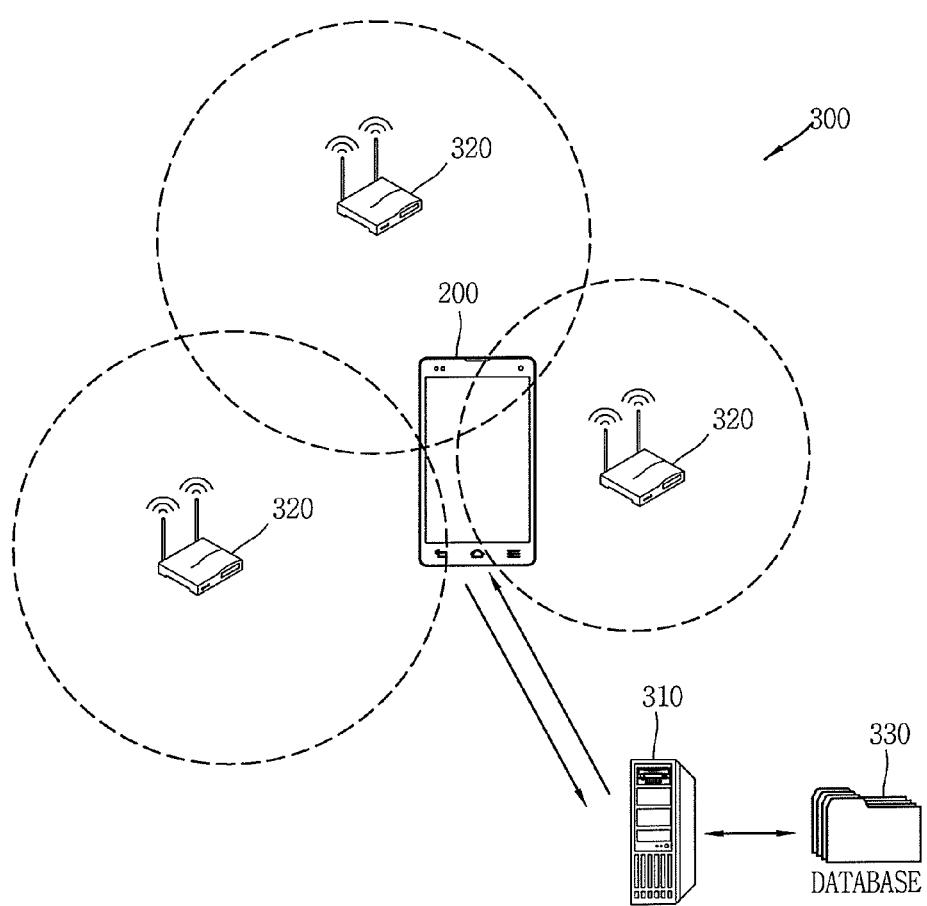

FIGS. 4A and 4B are conceptual views of a communication system operable with a mobile terminal connected with a headset in accordance with the present invention.

First, referring to FIG. 4A, such communication systems utilize different air interfaces and/or physical layers. Examples of such air interfaces utilized by the communication systems include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like.

By way of non-limiting example only, further description will relate to a CDMA communication system, but such teachings apply equally to other system types including the CDMA wireless communication system.

Referring now to FIG. 4A, a CDMA wireless communication system is shown having a plurality of mobile terminals 100, a plurality of base stations (BSs) 270, base station controllers (BSCs) 275, and a mobile switching center (MSC) 280. The MSC 280 is configured to interface with a conventional Public Switch Telephone Network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs 275 can be included in the system as shown in FIG. 42A.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). In some cases, the term "base station" may be used to refer collectively to a BSC 275, and one or more base stations 270. The base stations may also be denoted as "cell sites." Alternatively, individual sectors of a given base station 270 may be referred to as cell sites.

Referring to FIG. 4A, a broadcasting transmitter (BT) 295 may transmit a broadcast signal to terminals operating within the system. The broadcasting reception module 111 illustrated in FIG. 1 may be provided in the terminal for receiving the broadcasting signal transmitted from the BT 295.

FIG. 4A further depicts several Global Positioning System (GPS) satellites 300. Such satellites 300 facilitate locating the position of at least one of plural mobile terminals 100. Two satellites are depicted in FIG. 4A, but it is understood that useful position information may be obtained with greater or fewer satellites than two satellites. The GPS module 115 (FIG. 1) is typically configured to cooperate with the satellites 300 to obtain desired position information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and executing other communications. Each reverse-link signal received by a given base station 270 is processed within that base station 270. The resulting data is forwarded to an associated BSC 275. The BSC 275 provides call resource allocation and mobility management functionality including the orchestration of soft handoffs between base stations 270. The BSCs 275 also route the received data to the MSC 280, which then provides additional routing services for interfacing with the PSTN 290. Similarly, the PSTN 290 interfaces with the MSC 280, and the MSC 280 interfaces with the BSCs 275, which in turn control the base stations 270 to transmit sets of forward-link signals to the mobile terminals 100.

Hereinafter, description will be given of a method for acquiring location information of a mobile terminal using a Wireless Fidelity (WiFi) Positioning System (WPS), with reference to FIG. 4B.

The WiFi positioning system (WPS) 300 refers to a positioning technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 may extract the information about the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 4B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as a MAC address, SSID, RSSI, channel information, a privacy, a network type, latitude and longitude coordinates of the wireless AP, a building at which the wireless AP is located, a floor number, detailed indoor location information (GPS coordinates available), an AP owner's address, a phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched with the retrieved wireless AP, thereby extracting location information related to the mobile terminal 100.

The aforementioned headset 100 according to the one embodiment disclosed herein may receive a call signal from the connected mobile terminal 200, and connect the call signal received from the mobile terminal 200 as the earphones 31 of the headset 100 are inserted into user's ears. Also, while the call is connected, when one of the plurality of earphones inserted is separated, the controller 80 of the headset 100 may activate a function for controlling an operation of the mobile terminal 200 based on the user's voice input through the microphone 52 with maintaining the connected call. That is, the operation of the mobile terminal 200 can be controlled during a call with a counterpart terminal, which may enable checking of information stored in the mobile terminal 200 or storing (saving) of some of conversion of the call in the mobile terminal 200.

The result of the operation of the mobile terminal 200 which has been executed based on the user's voice input during the activation of the function is output through the other earphone 31 of the headset 100. Here, the output of the voice of the counterpart may be restricted while audible data corresponding to the operation result is output from the mobile terminal 200 to the other earphone 31. That is, the controller 80 may control an output path of an audio signal (or a voice signal) such that only the operation result of the mobile terminal 200 can be output through the other earphone 31 with restricting the output of the voice of the counterpart with which the call is currently connected.

Meanwhile, when the separated earphone 31 is reinserted into the user's ear, the controller 80 of the headset 100 switches the function into an inactive state, and converts the user's voice input through the microphone 52 to be transmitted to the counterpart's terminal with which the call is currently connected. That is, the controller 80 may control an output path of the audio signal such that the user's voice input through the microphone 52 can be delivered directly to the counterpart's terminal with which the call is currently connected.

As described above, the headset 100 according to the present invention may control the operation of the mobile terminal based on the voice during the call with the counterpart's terminal, thereby immediately obtaining desired information while the call is connected. The switching from a call mode into a voice control mode can be freely performed by the user's intuitive operation, thereby providing convenience to the user.

Figure 5:
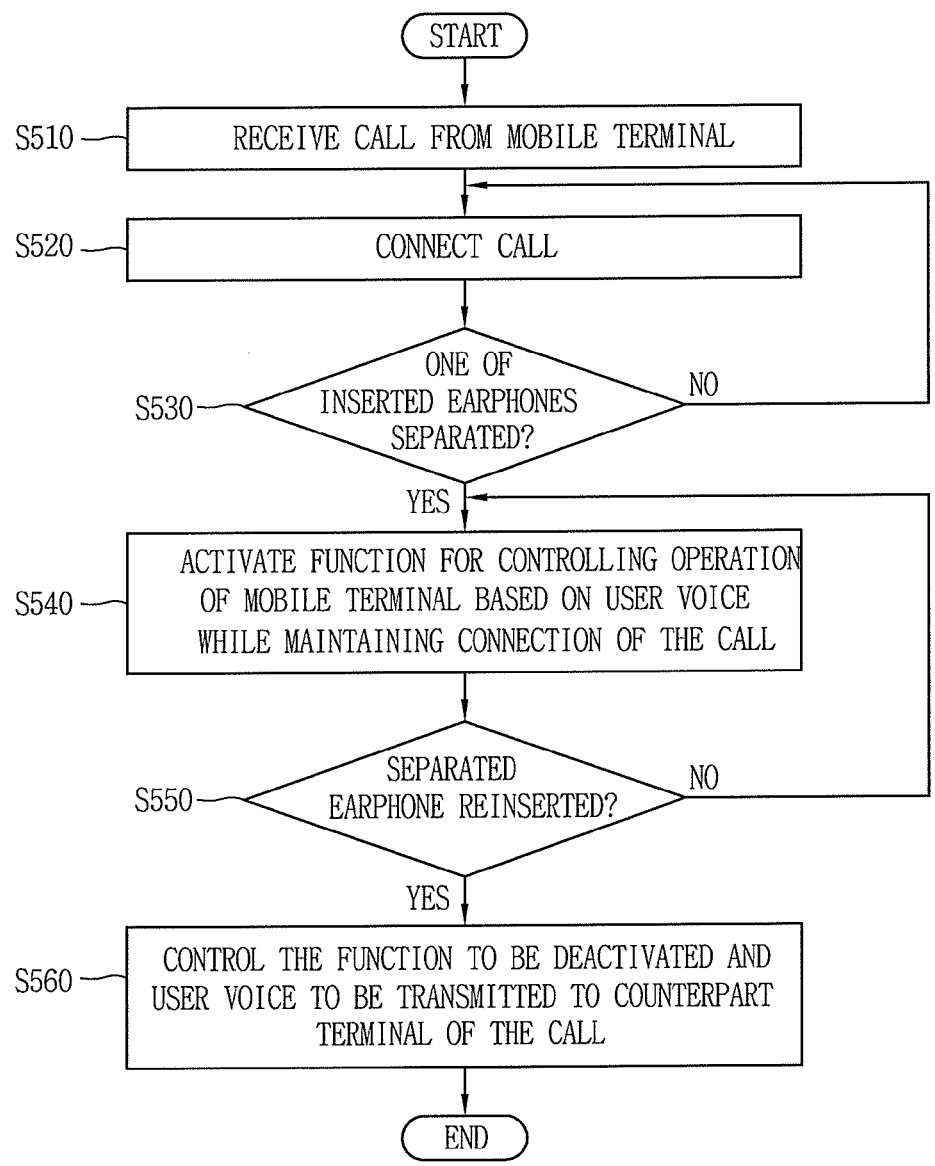

FIG. 5 is a flowchart representatively illustrating a method for controlling an operation of a mobile terminal during a call using a headset in accordance with the present invention. Meanwhile, embodiments to be explained hereinafter assume that the headset 100 is connected with the mobile terminal 200. For example, when it is sensed that the headset 100 is worn on a specific part of a user's body, for example, on a neck, the headset 100 and the mobile terminal 200 may be automatically connected to each other.

Referring to FIG. 5, a call is received from the connected mobile terminal (S510). When the call is received, a notification, for example, sounds or vibration may be output through the speaker 35, the earphone 31 or the haptic module 60 of the headset 100 so as to notify the reception of the call.

Here, the controller 80 of the headset 100 may recognize whether the earphones 31 are inserted into both of the user's ears, on the basis of sensor values transferred from the sensor unit 40 and/or the earphone coupling portion 15.

To this end, the sensor unit 40, for example, at least one of a temperature sensor, a touch sensor, a pressure sensor, an illumination sensor and a proximity sensor may be provided on an outer side of each earphone 31 of the headset 100 to sense whether or not the earphone 31 has been inserted into the user's ear. In detail, when the sensor values of the sensor provided in the sensor unit 40 are transferred to the controller 80, the controller 80 may detect, based on the transferred sensor values, whether the earphones 31 of the headset 100 have been inserted into both of the user's ears, whether the earphone 31 has been inserted into the left ear or the right ear if the earphone 31 is inserted into only one of the user's ears, or whether or not the inserted earphone 31 has been separated.

When a call is received from the mobile terminal 200 while at least one of the earphones 31 of the headset 100 is inserted, the controller 80 may output counterpart information corresponding to the received call through the earphone 31 immediately or in response to a user's input, without sensing whether the earphone 31 has been inserted into the user's ear.

Responsive to the reception of the call, the earphone 31 of the headset 100 may be inserted into the user's ear or a predetermined input is applied to the user input unit 51 provided on the earphone 31 or the headset 100, thereby connecting the call received from the mobile terminal (S520).

During the call, when it is sensed that one of the inserted earphones 31 is separated (S530), the controller 80 may activate a function for controlling an operation of the mobile terminal 200 based on a user's voice input through the microphone 52 while the call is connected (S540).

Here, the controller 80 may output sounds or vibration through the other earphone or the haptic module 60 of the headset 100 to notify the activation of the function, namely, the function for controlling the operation of the connected mobile terminal 200 by use of voice.

The controller 80 may sense whether the earphone has been separated from the left ear or the right ear by use of an insertion detecting sensor 41 provided on the outer side of the earphone 31, for example, at least one of the temperature sensor 47, the touch sensor 48, the pressure sensor 49, the illumination sensor and the proximity sensor. In this instance, the controller 80 may limit the condition of activating the function, to a case where the earphone at a specific position has been separated.

For example, in case where the user is set to a right-handed person, when the left earphone is separated, the controller 80 may activate the function for controlling the operation of the mobile terminal. On the other hand, when the right earphone is separated, the controller 80 may recognize it as an operation for hearing external sounds during the call so as to turn down a call volume.

Here, during the activation of the function, the controller 80 may restrict the user's voice input through the microphone 52 from being delivered to the counterpart terminal of the call. That is, the controller 80 may control a voice (or audio) input path such that the user's voice input through the microphone 52 can be delivered only to the mobile terminal 200, not to the counterpart terminal with which the call is connected.

Also, the controller 80 may generate a control command for controlling an operation of the mobile terminal 200 based on the user's voice input through the microphone 52 while the function is activated, and then provide the generated control command to the mobile terminal 200.

To this end, when one of the earphones 31 of the headset 100 is separated during the call, the mobile terminal 200 may automatically activate a voice recognition function and a speech to text (STT) function thereof. The controller 80 of the headset 100 may then analyze the user's voice input through the microphone 52 and control the operation of the mobile terminal based on the analysis result.

For example, when the user's voice like "let me know Tom's phone number' is input through the microphone 52 of the headset 100, the mobile terminal 200 may search for an item stored as 'Tom' in a phonebook, extract a corresponding phone number, and output the extracted phone number through the other earphone 31 or the speaker 35 of the headset 100. Here, the mobile terminal 200 may convert the user's voice transferred from the headset 100 into text, and display the converted text on a screen of the mobile terminal 200. The user may be provided with Tom's phone number stored in the mobile terminal 200 through the other earphone 31 which has not been separated. This may allow the user to receive information stored in the mobile terminal 200 in the form of audible data even without a direct manipulation of the mobile terminal 200.

The controller 80 may also generate the next control command by narrowing down a search range on the basis of the operation result transferred from the mobile terminal 200. That is, the controller 80 may instruct the mobile terminal 200 to execute an associated operation/search on the basis of the previous operation result of the mobile terminal 200.

For example, after 'Tom's phone number' has been provided through the other earphone 31 of the headset 100 in the above example, when the user inputs a voice "what's the next appointment?" through the microphone 52, the next meeting with 'Tom' can automatically be searched for through a calendar application or the like, even though the user does not say 'Tom.'

In this manner, even during the control of the operation of the mobile terminal 200 based on the user's voice input through the microphone 52, the call connected with the counterpart terminal is maintained. Here, a preset on-hold (standby) sound or a voice guidance may be output to the counterpart terminal.

Next, when the separated earphone 31 is inserted back into the user's ear (S550), the controller 80 may deactivate the function for controlling the operation of the mobile terminal 200 and control the user's voice input through the microphone 52 to be sent to the counterpart terminal again (S560). Meanwhile, when the other earphone is separated as well, the controller 80 may determine it as the user does not want to continue the call any more, and end the connected call.

As described above, according to the present invention, while talking with the counterpart through the earphones, information can be searched for through the voice even without the direct manipulation of the terminal, and the searched information can be provided through the earphones.

FIGS. 6A to 6E are exemplary views illustrating the flowchart of FIG. 5 in more detail.

Figure 6A:
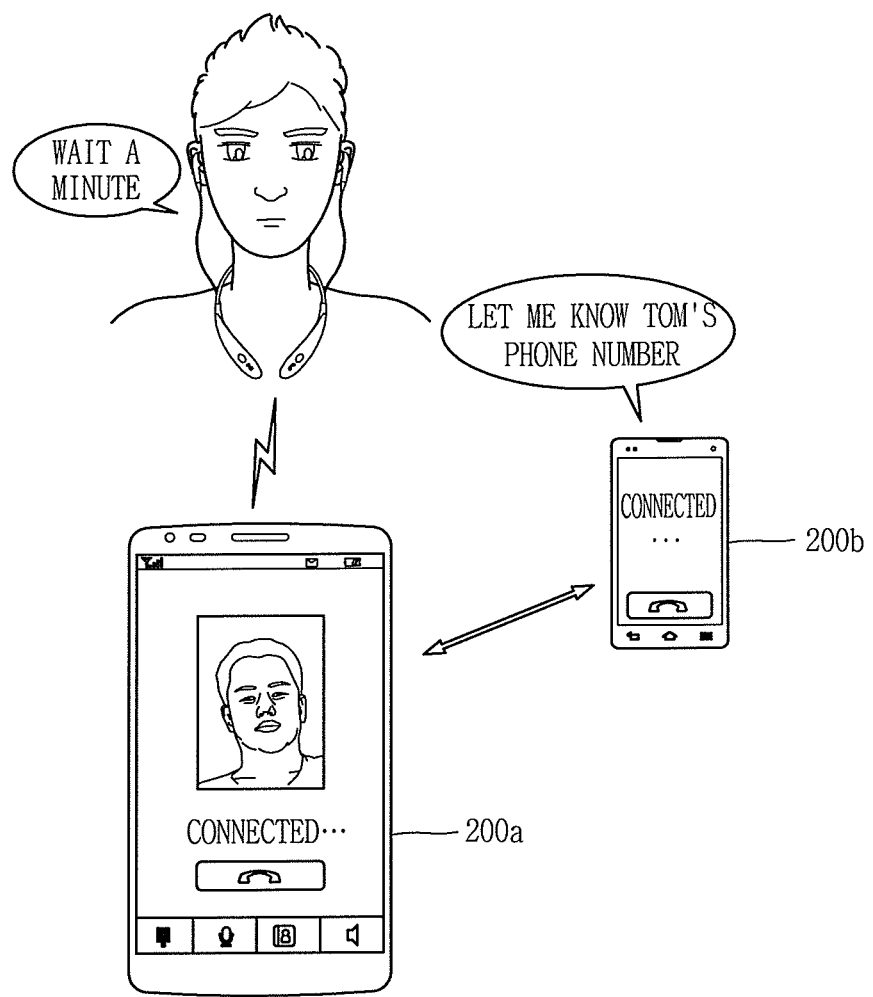

As illustrated in FIG. 6A, the user may perform a call with a counterpart terminal 200b through the earphones 31 coupled to the headset 100. Here, when the user desires to check information stored in a mobile terminal 200a, for example, when the user desires to know 'Tom's phone number,' as illustrated in FIG. 6B, the user may separate one of the inserted earphones (611), so as to enter a voice control mode for controlling the operation of the mobile terminal 200a using the user's voice while maintaining the call.

Figure 6B:
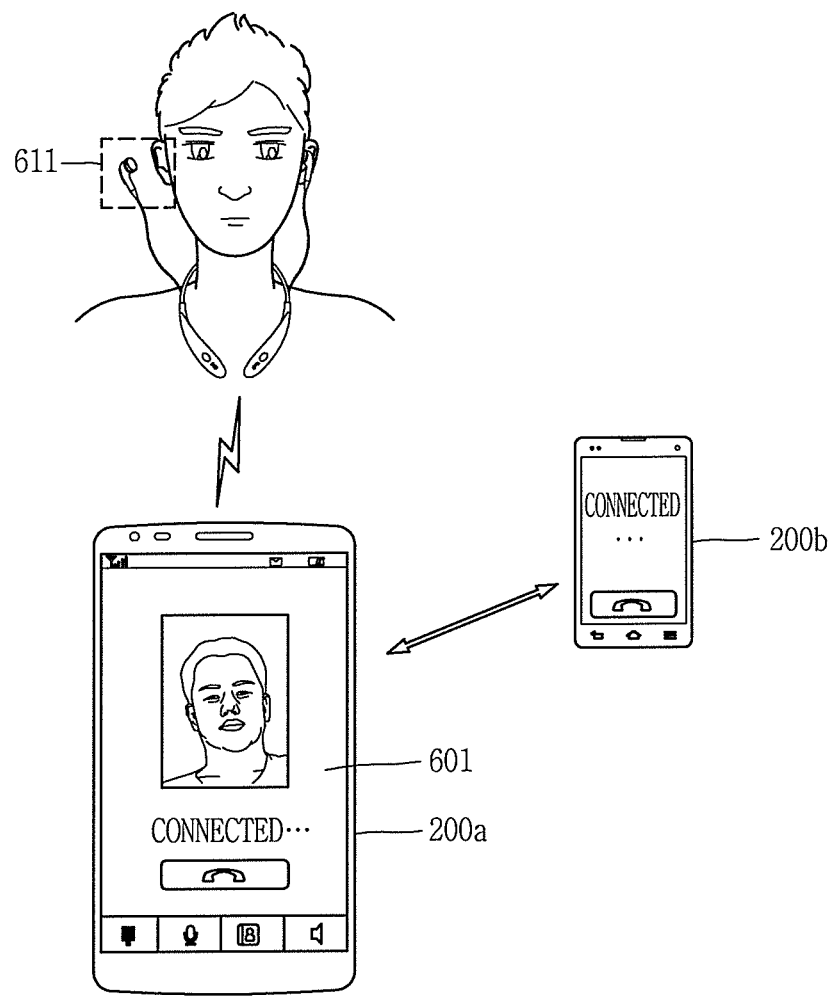

FIG. 6B exemplarily illustrates an operation that the user removes the right earphone from the ear, but not limited to this. The entrance into the voice control mode may be carried out by an operation of removing the left earphone. Meanwhile, when it is set to enter the voice control mode by an operation of separating (removing) an earphone located at a preset specific position, the voice control mode can be entered only when the earphone located at the preset specific position (for example, a left or right ear) is separated.

When the voice control mode is entered, the mobile terminal 200a may automatically activate the voice recognition function and the STT function. The controller 80 may control audible data, which notifies the activation of the function for controlling the operation of the mobile terminal 200a based on the user's voice, to be output through the other earphone inserted.

Figure 6C:
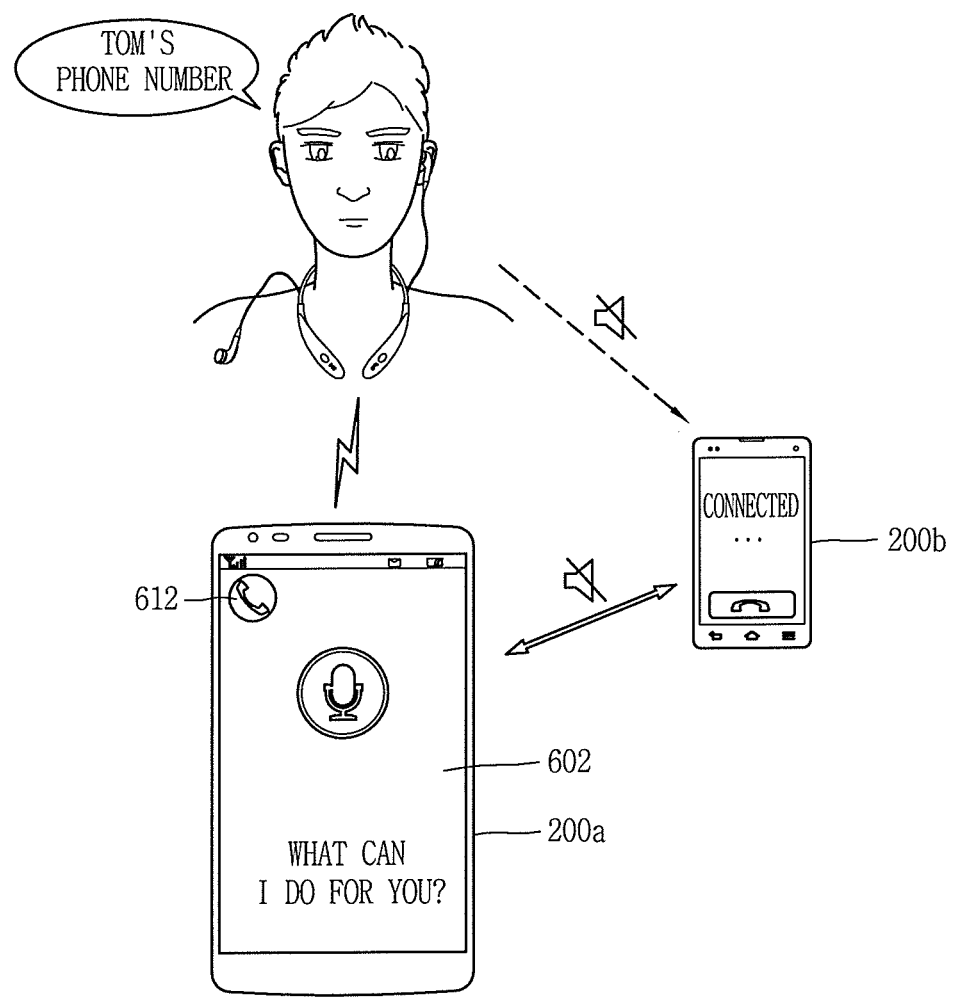
Figure 6D:
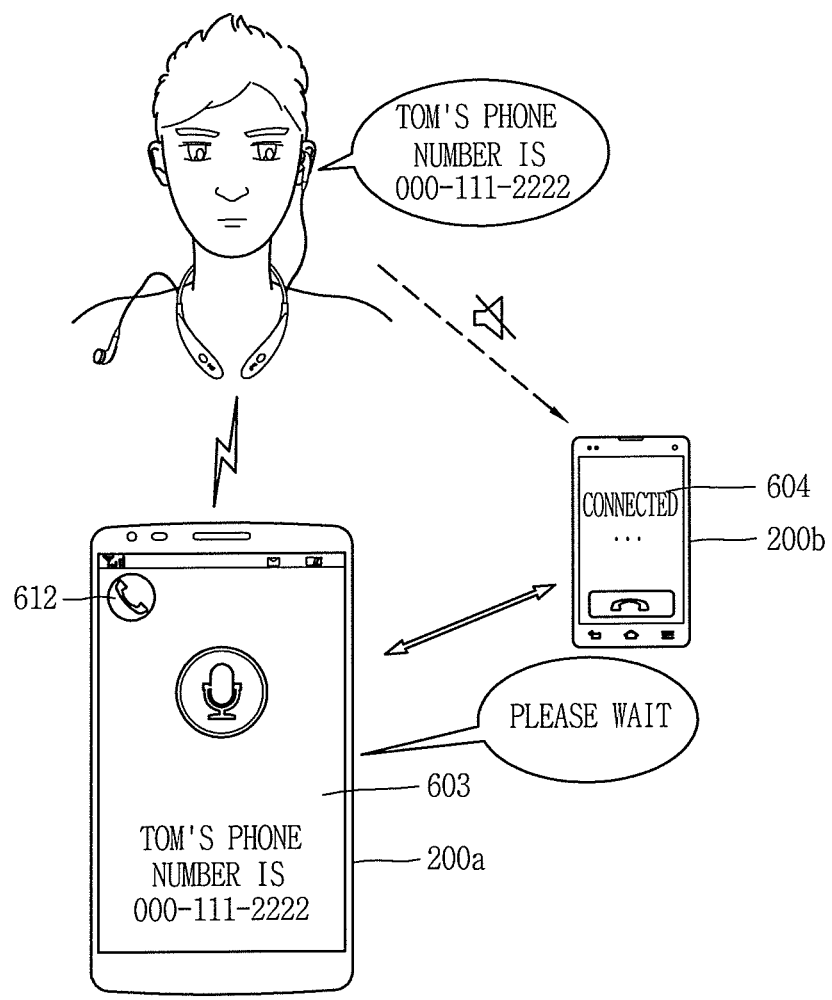
Figure 6E:
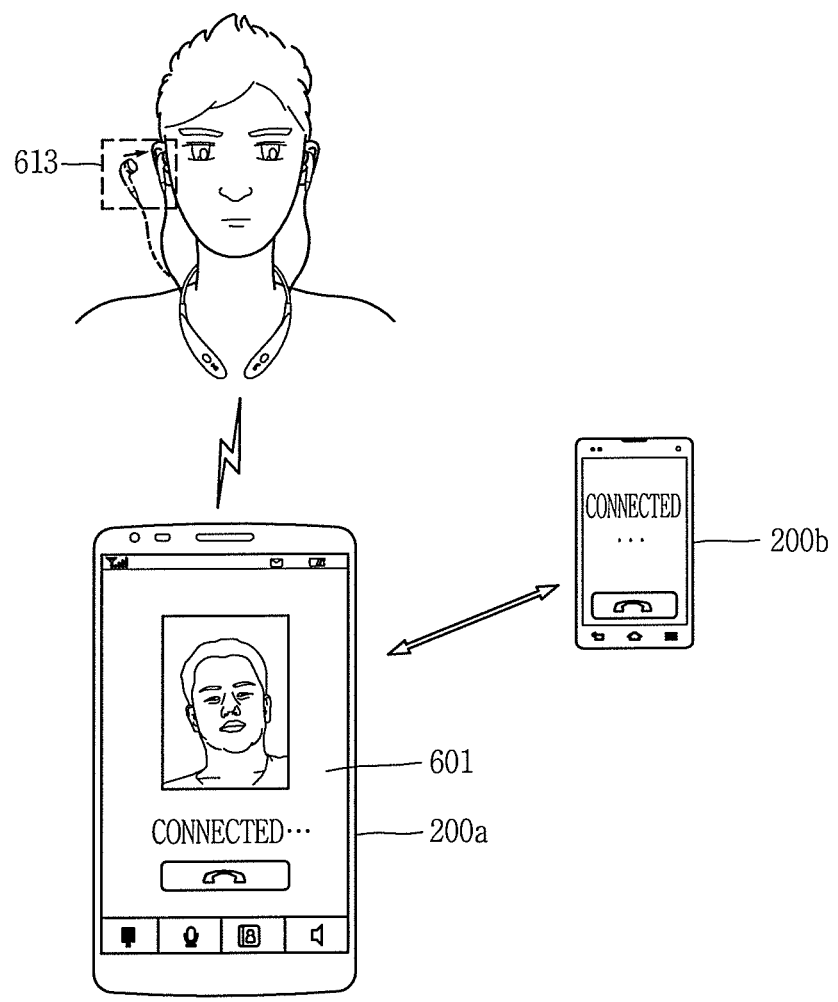

Accordingly, as illustrated in FIG. 6C, a voice guidance notifying an entrance into the voice control mode, for example, a voice like 'what can I do for you?' may be output through the earphone 31. Here, the voice guidance may not be delivered to the counterpart terminal 200b in some cases. For example, the voice guidance may not be output to the counterpart terminal 200b when the voice control mode is deactivated within a predetermined time or the user selects the voice guidance not to be output by applying a user input.

Next, referring to FIG. 6C, when the user inputs a voice command, for example, 'Tom's phone number' through the microphone 52, the controller 80 of the headset 100 may restrict an input of the voice command through the microphone 52 such that the input voice command can be delivered only to the mobile terminal 200a, not to the counterpart terminal 200b. Meanwhile, the display unit of the mobile terminal may output an icon 612, which indicates that a call is currently performed, on one region of a screen 602 corresponding to the voice control mode.

The mobile terminal 200a executes an operation corresponding to the input voice command, using the voice recognition function and the STT function. As a result, referring to FIG. 6D, the mobile terminal 200a searches for the phone number of 'Tom' from the phonebook thereof, and converts the search result into audible data to provide to the headset 100. The controller 80 then outputs the operation result of the mobile terminal 200a, which corresponds to the user's voice input in response to the activation of the voice control mode, to the other inserted earphone 31. Here, the operation result of the mobile terminal 200a, namely, 'Tom's phone number' may be output only through the earphone 31, without being delivered to the counterpart terminal 200b. That is, the controller 80 may restrict the output of an audio signal such that the operation result of the mobile terminal 200a cannot be delivered to the counterpart terminal 200b.

In this manner, while the operation result of the mobile terminal 200a is output through the other inserted earphone 31, an on-hold voice or voice guidance may be output to the counterpart terminal 200b. Meanwhile, referring to FIG. 6E, when the separated earphone 31 is inserted back into the user's ear (613), the voice control mode may be deactivated and the call with the counterpart terminal 200b may be restarted (or reconnected). That is, the controller 80 may control input and output of voice signals, such that the user's voice input through the microphone 52 can be delivered to the counterpart terminal 200b and the counterpart voice input to the counterpart terminal 200b can be output through the earphone 31 of the headset 100 without being restricted. The screen 602 corresponding to the voice control mode is converted into a call screen 601 on the display unit of the mobile terminal 200a.

Hereinafter, description will be given in more detail of a method of connecting or refusing an incoming call of the mobile terminal 200a in association with the steps S510 and S520, with reference to FIGS. 7A to 7D.

Figure 7A:
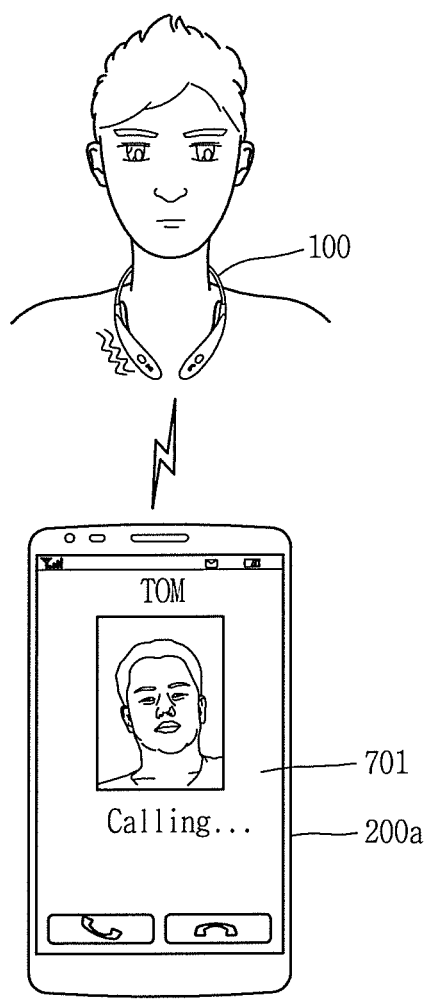

As illustrated in FIG. 7A, the headset 100 in accordance with the embodiment disclosed herein may be connected to the mobile terminal 200a through one of Bluetooth™, radio frequency identification (RFID), infrared data association (IrDA), ultra wideband (UWB), ZigBee, near field communication (NFC), Wi-Fi, Wi-Fi direct, and wireless universal serial bus (USB), thereby receiving the call signal received from the mobile terminal 200a. That is, a notification signal notifying the generation of the incoming call from the mobile terminal 200a may be delivered through the haptic module 60 provided in the body 10 of the headset 100. Also, although not illustrated, when both of the earphones 31 are coupled to the earphone coupling portions 15, respectively, the notification signal may be output in the form of sound through the speaker 35.

Figure 7B:
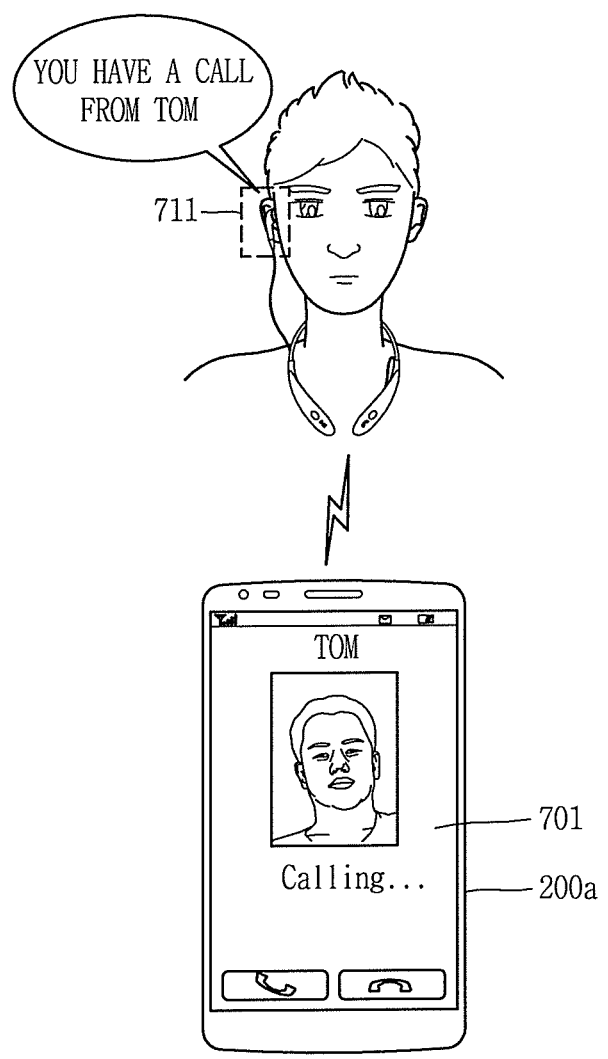

Here, as illustrated in FIG. 7B, when one of the earphones is inserted into the ear (711), counterpart information corresponding to the call is output through the inserted earphone. When the counterpart of the call has been saved in the mobile terminal 200a, as illustrated in FIG. 7B, a voice guidance notifying the counterpart name and the generation of the call, such as "you have a call from Tom' is output. On the other hand, when the counterpart of the call has not been saved in the mobile terminal 200a, a voice guidance notifying a phone number of the counterpart and the generation of the call may be output.

Figure 7C:
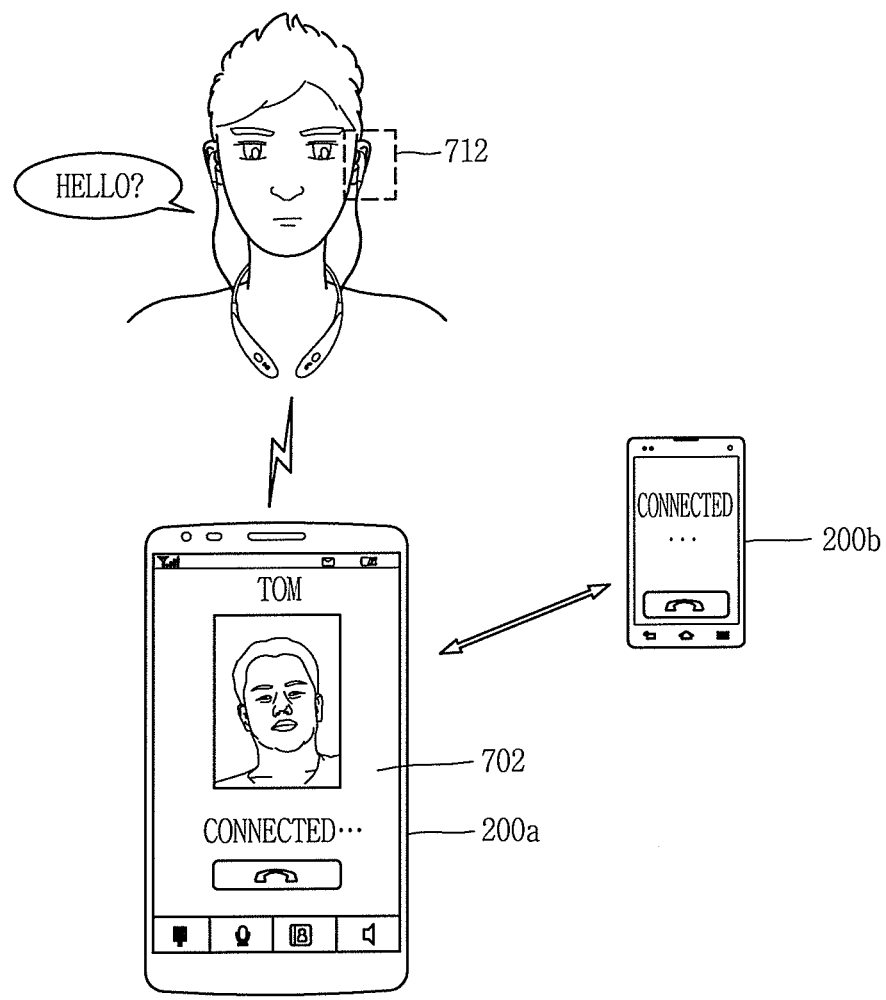
Figure 7D:
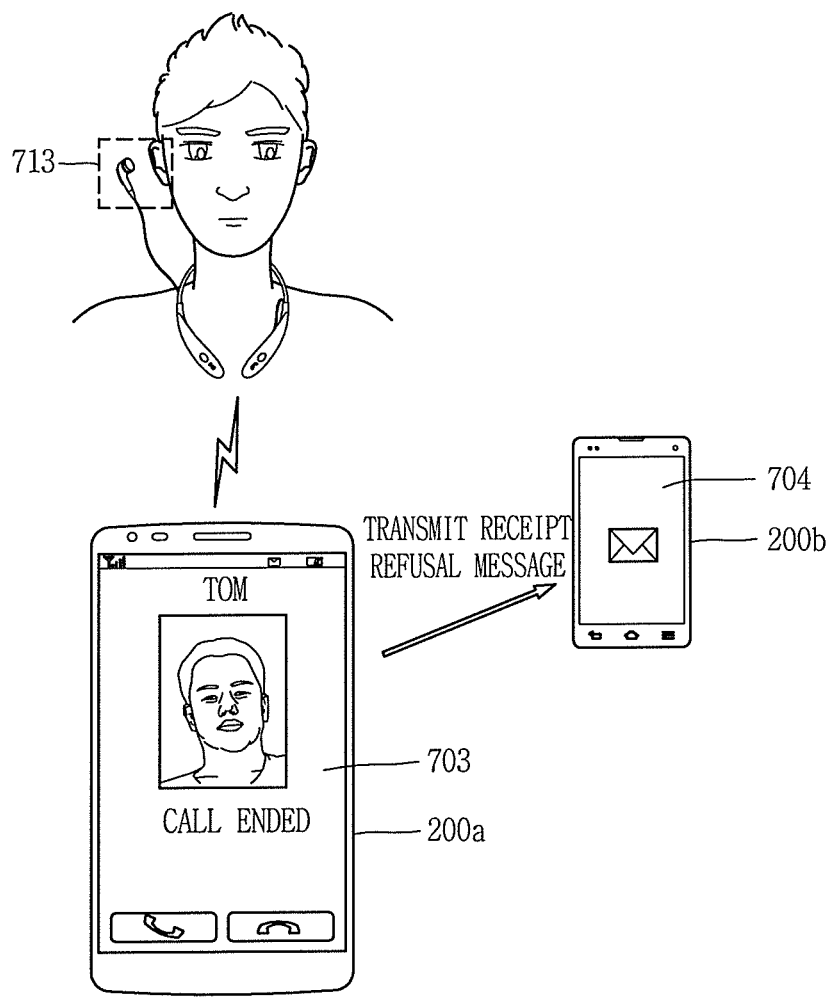

When the user wants to connect the incoming call, as illustrated in FIG. 7C, the user may insert the other earphone into the ear (712) so as to perform the call with the counterpart terminal 200b. On the other hand, when the user does not want to connect the incoming call, as illustrated in FIG. 7D, the user may separate the previously-inserted earphone (713) to refuse the call with the counterpart terminal 200b. Here, when a touch input is applied to the touch sensor 48 provided on the outer side of the previously-inserted earphone before separating the earphone or the previously-inserted earphone is separated while applying the touch input to the touch sensor 48, a preset receipt refusal message is transmitted to the counterpart terminal 200b (704).

Hereinafter, description will be given in more detail of exemplary embodiments for executing various operations during a call by inserting/separating the earphones 31 during the call with a counterpart and/or applying touches to the touch sensors provided on the earphones 31, by use of the headset 100.

The following table 1 exemplarily shows user's operations for processing a call received from the mobile terminal 200a or executing another operation during the call, using the earphones of the headset 100.

TABLE 1

| User operation for earphones | Earphone state | Receipt of first call |
|---|---|---|
| One earphone inserted | One inserted, the other not inserted | Providing counterpart Information |
| Both earphones inserted | Both inserted | Call connection |
| One earphone separated | One inserted, the other not inserted | Activation of voice control function |
| Both earphones separated | Both not inserted | Call refusal/call end |
| Input to one earphone | Both inserted + touch input to one earphone | Input/output control of voice control function |
| Input to both earphones | Both inserted + simultaneous touch input to both earphones | — |
| Input to one earphone + separated | One inserted, the other not inserted | Input control of voice control function |
| Input to both earphones + separated | Both not inserted | — |

Operation of mobile terminal

As shown in Table 1, the controller 80 of the headset 100 may control different operations to be carried out during a call, according to cases where one or both of earphones are inserted, one or both of inserted earphones are separated, an input is intentionally applied to one or both of inserted earphones, and one or both of inserted earphones are separated while an input is intentionally applied thereto. The controller 80 may control processing for a call received or a voice control function of the mobile terminal 200 in various manners, by way of an operation of inserting or separating the earphones 31 into or from the user's ears and/or an operation of applying a touch to the earphones 31 in various touching manners.

To this end, the headset 100 according to one embodiment disclosed herein may include an insertion detecting sensor 41 provided in a unit, which is inserted into the user's ear to output sounds, and configured to sense insertion or separation of the earphone, and a touch sensor 48 provided on an outer side of the unit and configured to sense various touching methods. Here, the touch sensor 48 of the earphone 31 may be formed vertically long to have a predetermined thickness according to the shape of the earphone. The touch sensor 48 of each earphone 31 may have a different shape, color or protrusion structure such that a left side and a right side can be distinctive from each other.

Here, 'one earphone 31 inserted' means a case where one of the earphones is inserted in the user's ear with the other not inserted or maintained in a coupled state to the earphone coupling portion 15 within a predetermined time (several seconds), without distinction of left and right sides. 'One earphone 31 separated' means a case where one of both earphones inserted in the user's ears or one inserted earphone is separated out of the user's ear and fallen, separated and gripped, or separated and coupled to the earphone coupling portion 15, without distinction of left and right sides.

Also, 'both earphones inserted' means a case where both of earphones are inserted in the user's ears, with no distinction of an inserted order of the left or right side.

Here, the controller 80 may control different operations to be carried out by distinguishing whether the plurality of earphones 31 are inserted with a predetermined time interval or in a simultaneous manner. Here, 'the plurality of earphones 31 inserted simultaneously' includes a case where time points that the plurality of earphones 31 are inserted into the user's both ears are exactly the same as each other and a case where the plurality of earphones 31 are sequentially inserted within a predetermined time (for example, 1 to 2 seconds).

'Both earphones 31 separated' means a case where the plurality of earphones inserted are separated from the user's both ears and fallen, separated and gripped, or separated and coupled to the earphone coupling portions 15. Here, the controller 80 may also control different operations to be carried out by distinguishing whether the plurality of earphones 31 are inserted with a predetermined time interval or in a simultaneous manner. Here, 'the plurality of earphones 31 separated simultaneously' includes a case where time points that the plurality of earphones 31 are separated from the user's both ears are exactly the same as each other and a case where the plurality of earphones 31 are sequentially separated within a predetermined time (for example, 1 to 2 seconds).

The controller 80 may control different operations to be carried out according to a method of applying a touch input to the touch sensor 48 provided on the outer side of each earphone 31, for example, short touch input, long touch input, single tap, double tap, swipe input applied in one direction and the like, or a combination of the touch input and inserted/separated time points of the earphones 31. Also, the controller 80 may decide a different operation to be carried out next according to a current operating state of the mobile terminal.

FIGS. 8A to 8D are conceptual views illustrating a method for providing an operation result of a mobile terminal corresponding to a voice control mode to a counterpart terminal, with which a call is currently connected, on the basis of 'one earphone 31 separated' and an input to the earphone 31 during the call, by use of the headset.

Figure 8A:
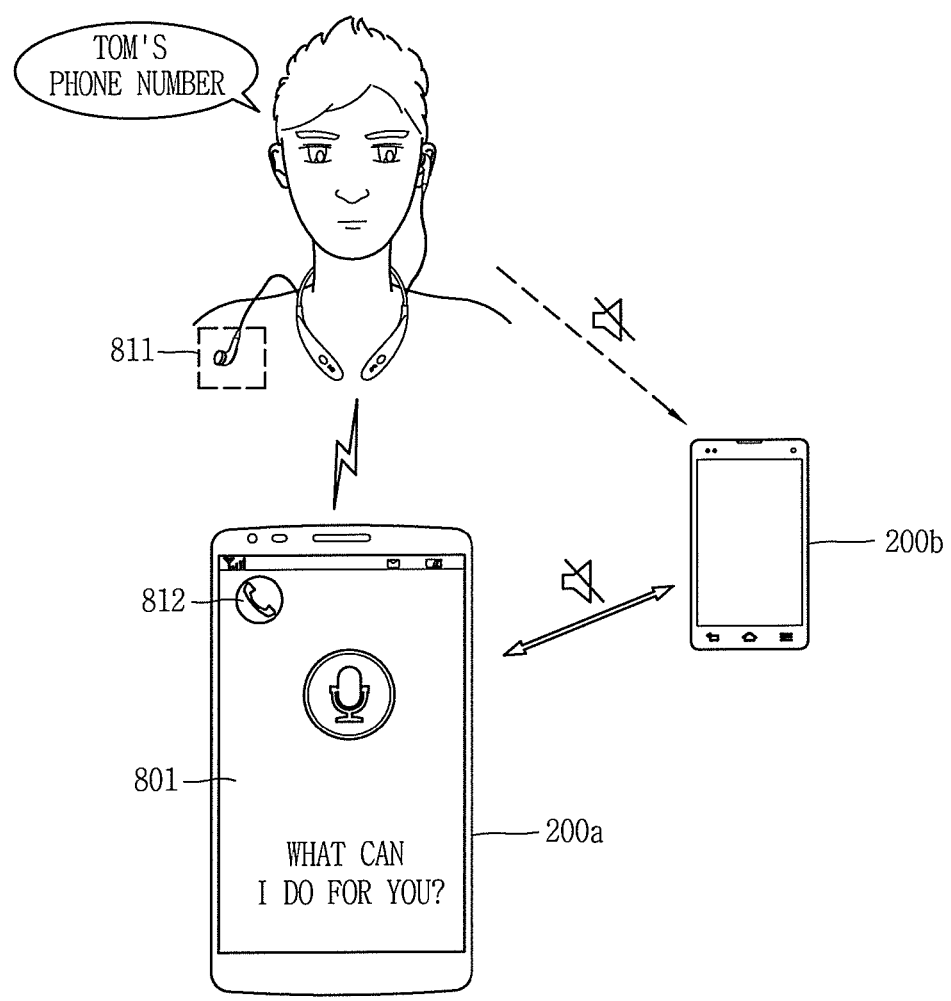

As illustrated in FIG. 8A, when one of the earphones 31 is separated during a call, the voice control mode is activated and thus an operation of the mobile terminal 200a is controlled based on a user's voice input through the microphone 52. For example, when a voice guidance, such as 'what can I do for you?,' is output through the other earphone 31 inserted, the user may control the operation of the mobile terminal 200a by inputting a voice command for searching for desired information through the microphone 52. Here, the example merely illustrates, but not limited to, that a phone number stored in the mobile terminal 200a is searched for. The user may also transfer an execution command of an application, such as 'Open a web application' or a complicated control command based on an operation of a location information module, such as 'let me know where I am.' Or, the user may also accurately obtain desired information through several steps in a manner of chatting with the mobile terminal 200a, on the voice basis.

Figure 8B:
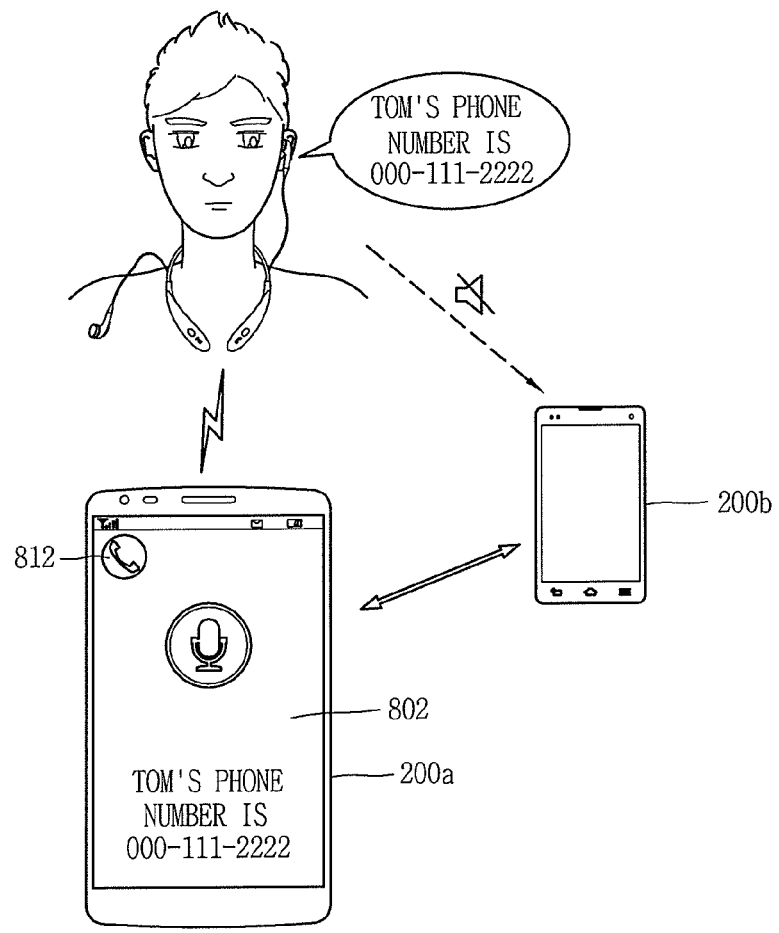

As illustrated in FIG. 8B, while a search result corresponding to a searched 'Tom's phone number' is converted into audible data and output through the other earphone, a counterpart voice input to the counterpart terminal 200b is not output to the other earphone, and the search result output from the mobile terminal 200a is not output to the counterpart terminal 200b.

Figure 8C:
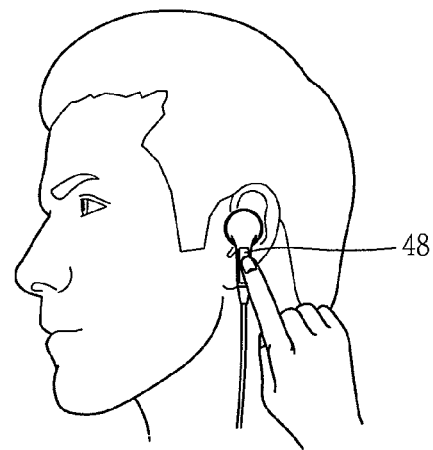
Figure 8D:
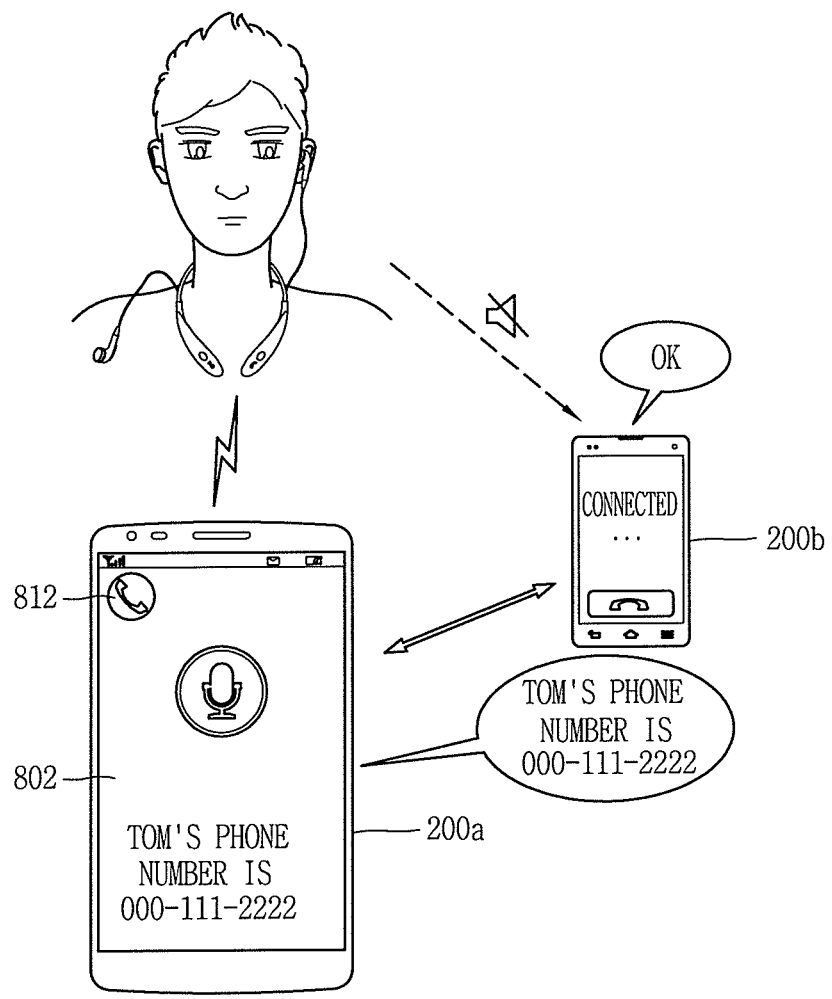

Here, as illustrated in FIG. 8C, when the user applies a preset touch input, for example, a double tap to the touch sensor 48 of the other earphone inserted, the audible data corresponding to the search result, as illustrated in FIG. 8D, is delivered to the counterpart terminal 200b. That is, when the double tap is applied to the other earphone, the controller 80 may change an output path of the audible data corresponding to the search result to the counterpart terminal 200b, or divide the output path of the audible data into the earphone 31 and the counterpart terminal 200b.

As another example, as illustrated in FIG. 8C, when the touch input, for example, the double tap applied to the touch sensor 48 of the other earphone is maintained for more than a reference time (for example, 2 seconds), the audible data corresponding to the search result may be transmitted to the counterpart terminal 200b corresponding to the call in the form of a message. Here, the output path of the audible data corresponding to the search result may not change.

In this state, when the separated earphone is reinserted and thus the earphone state 'both earphones 31 inserted' is sensed, the controller 80 may deactivate the voice control function and reconnect the paused call. Here, while or after the audible data corresponding to the search result is output through the earphone 31, when the other earphone separated is inserted back into the user's ear while a preset touch input, for example, a long touch input is applied to the touch sensor 48 of the other earphone, the search result is output simultaneously to the user's earphone and the counterpart terminal 200b. Here, since it is not the output of the audio signal according to the voice control function, the input/output path of the audio signal is not restricted. That is, the counterpart voice which is input to the counterpart terminal 200b is output directly through the earphone 31, and the user's voice which is input through the microphone 52 is transferred directly to the counterpart terminal 200b.

Figure 9A:
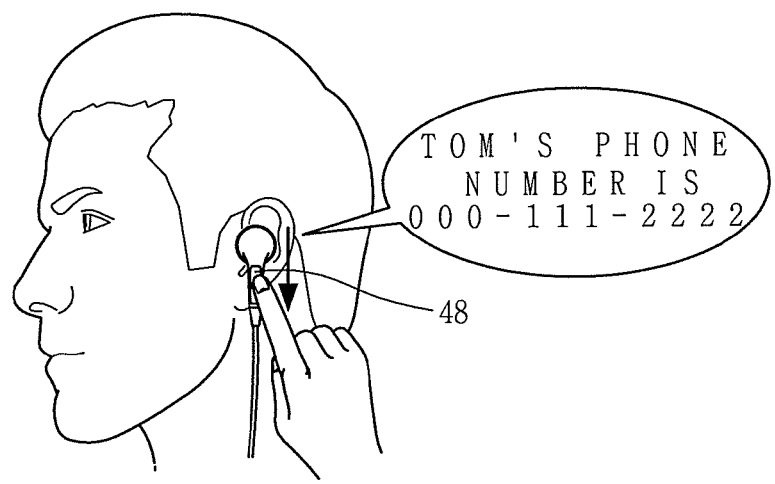
Figure 9B:
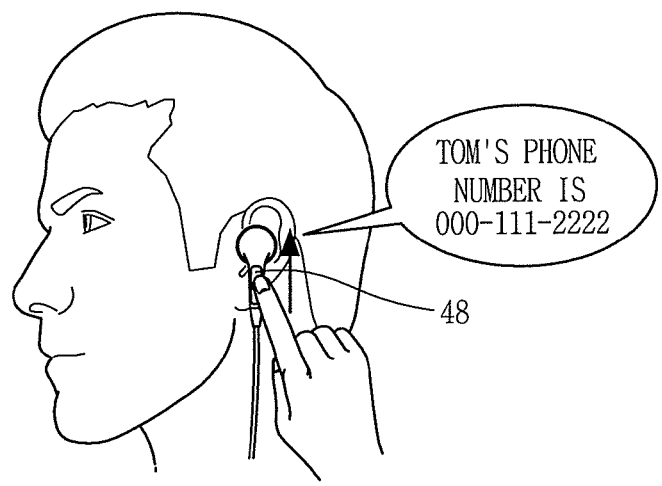

FIGS. 9A and 9B are conceptual views illustrating a method of adjusting an output speed of the operation result of the mobile terminal by applying an input to the earphone 31 while the voice control function is activated in response to 'one earphone separated' during a call.

While the operation result corresponding to the voice control function is output through one earphone in an inserted state, the user, as illustrated in FIG. 9A, may apply a swipe input of swiping down the touch sensor 48 provided on the outer side of the earphone 31, so as to reduce an output speed of the audible data corresponding to the search result into a slower speed. Here, the degree (or level) of reducing the output speed may be adjusted in proportion to the number of the swipe input applied, speed of applying the swipe input and the like.

Similar to this, the user, as illustrated in FIG. 9B, may apply a swipe input of swiping up the touch sensor 48 provided on the outer side of the earphone 31, so as to increase the output speed of the audible data corresponding to the search result. The degree of increasing the output speed may also be adjusted in proportion to the number of the swipe input applied, speed of applying the swipe input and the like.

Although not illustrated, while the operation result corresponding to the voice control function is output through one earphone inserted, when a touch of rotating in a clockwise direction is applied to the touch sensor 48 provided on the outer side of the earphone 31, forwarding by a predetermined section is executed. On the other hand, when a touch of rotating in a counterclockwise direction is applied to the touch sensor 48, rewinding by a predetermined section is executed. This may be used to skip unnecessary sections to find desired information when there are a lot of search results, or to repetitively hear the search result when desiring to hear it again because the search result is important.

Or, when a preset touch input, for example, a long touch input is applied to the touch sensor 48 provided on the outer side of the other earphone 31 while the voice control function is activated, the controller 80 may control the audible data corresponding to the operation result of the mobile terminal 200a to be output in a rewinding manner by a reference section or the most recently-output audible data to be output again.

Figure 10A:
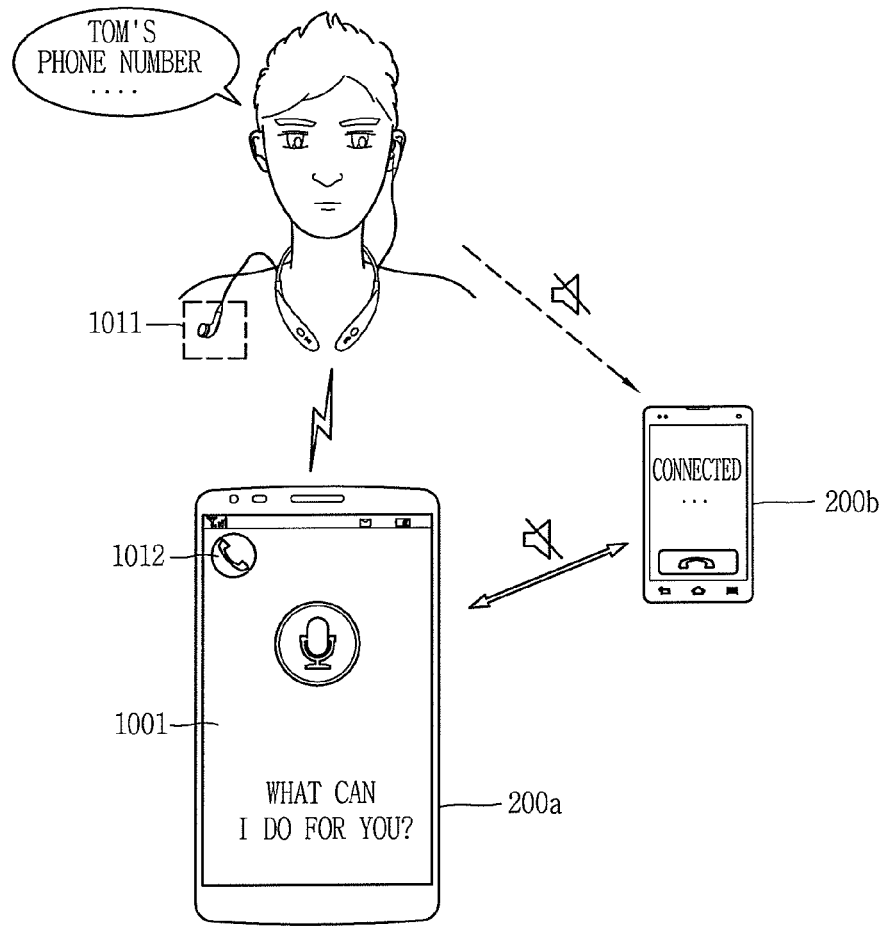
Figure 10B:
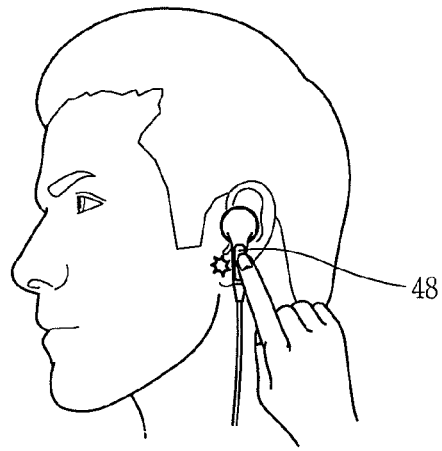
Figure 10C:
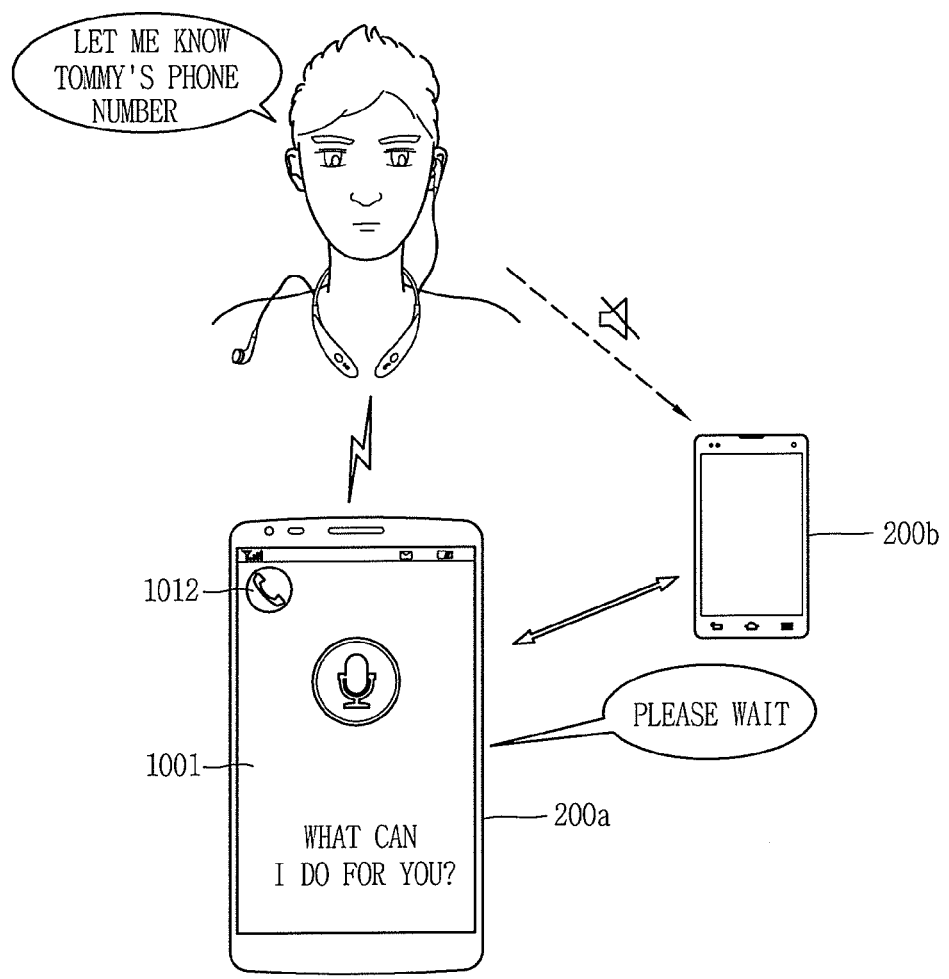

FIGS. 10A to 10C are conceptual views illustrating a method of correcting a control command for operating the mobile terminal by applying pressure to the earphone 31 while a voice control function is activated in response to 'one earphone 31 separated' during a call.

As illustrated in FIG. 10A, upon entering a voice control mode by separating (removing) one earphone during a call, a voice command may be input through the microphone 52. Here, when a wrong voice command is input, as illustrated in FIG. 10B, a preset touch input, for example, a long touch input may be applied to the touch sensor 48 of the other earphone inserted, to cancel the previously-input voice command and a new voice command may be input. Accordingly, the mobile terminal 200a may ignore the previously-input voice command (for example, 'Tom's phone number'), and as illustrated in FIG. 10C, perform an operation according to a newly-input voice command (for example, 'Tommy's phone number').

Figure 11A:
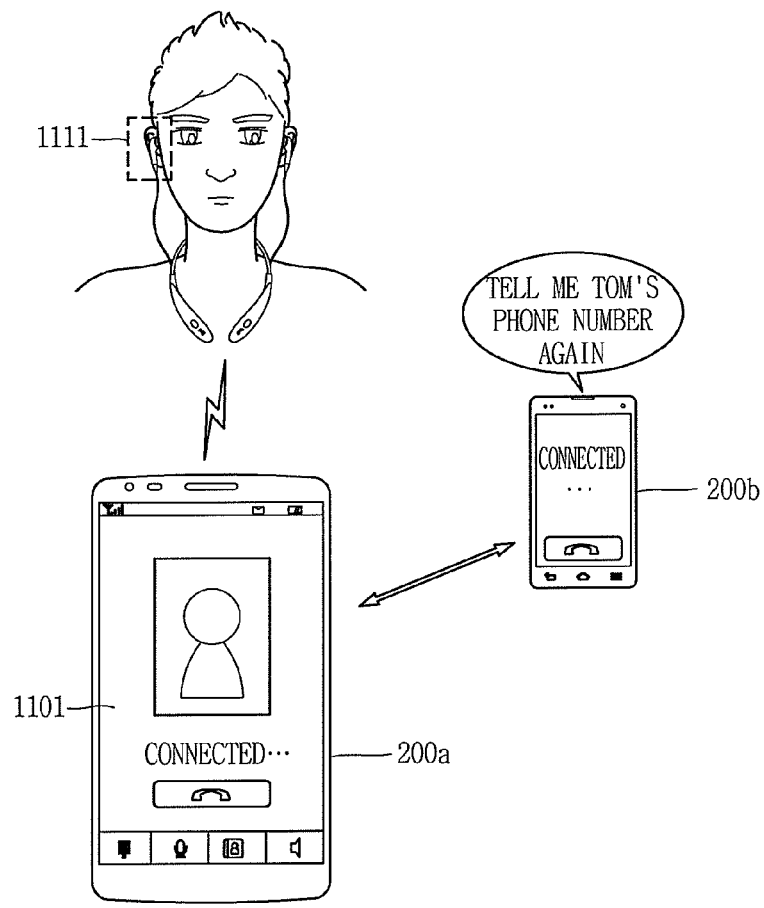
Figure 11B:
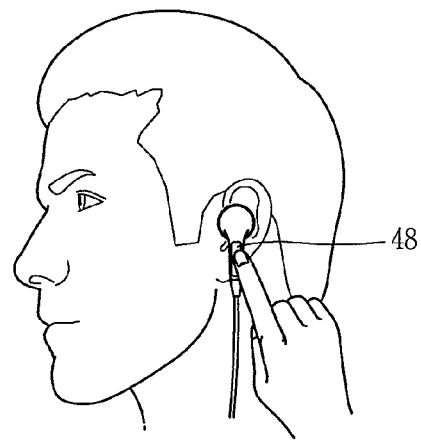
Figure 11C:
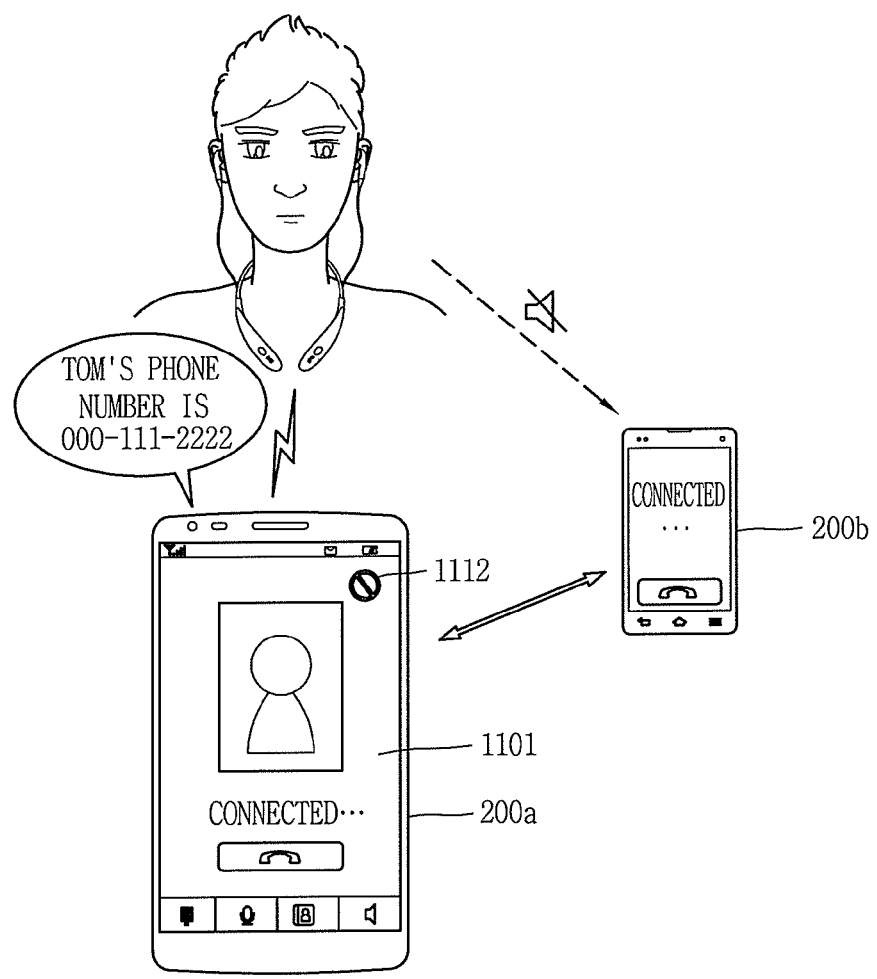

FIGS. 11A to 11C are conceptual views illustrating a method of rehearing the operation result of the mobile terminal which has been previously performed, while maintaining 'both earphones 31 inserted' during a call.

As illustrated in FIG. 11A, while a call is performed with both earphones 31 inserted, when 'input to one earphone,' for example, a long touch input is applied, as illustrated in FIG.

11B, to the touch sensor 48, the operation result of the mobile terminal 200a which has been performed in the previous voice control function is output to both of the user's earphone 31 and the counterpart terminal 200b. This is not an operation performed according to the voice control function, but a case of merely outputting previously-output audible data, which was temporarily stored, according to a control command transferred from the controller 80. Here, the controller 80 may restrict an output of an audio signal such that the user's voice input through the microphone 52 cannot be delivered to the counterpart terminal 200b so as for the counterpart to well hear the audible data corresponding to the operation result of the mobile terminal 200a.

FIGS. 12A to 12E are conceptual views illustrating a method of controlling the operation of the mobile terminal on the basis of a voice of a counterpart when 'one earphone 31 separated' is performed with 'input to one earphone' applied during a call.

After a call from the mobile terminal is connected in response to the plurality of earphones inserted, when one of the plurality of earphones inserted is separated while a preset touch input, for example, a long touch input is applied to the touch sensor 48 of the one of the plurality of earphones, the controller 80 may control an input path of an audio signal such that an input for executing the voice control function can be carried out based on a voice of a counterpart of the call.

Figure 12A:
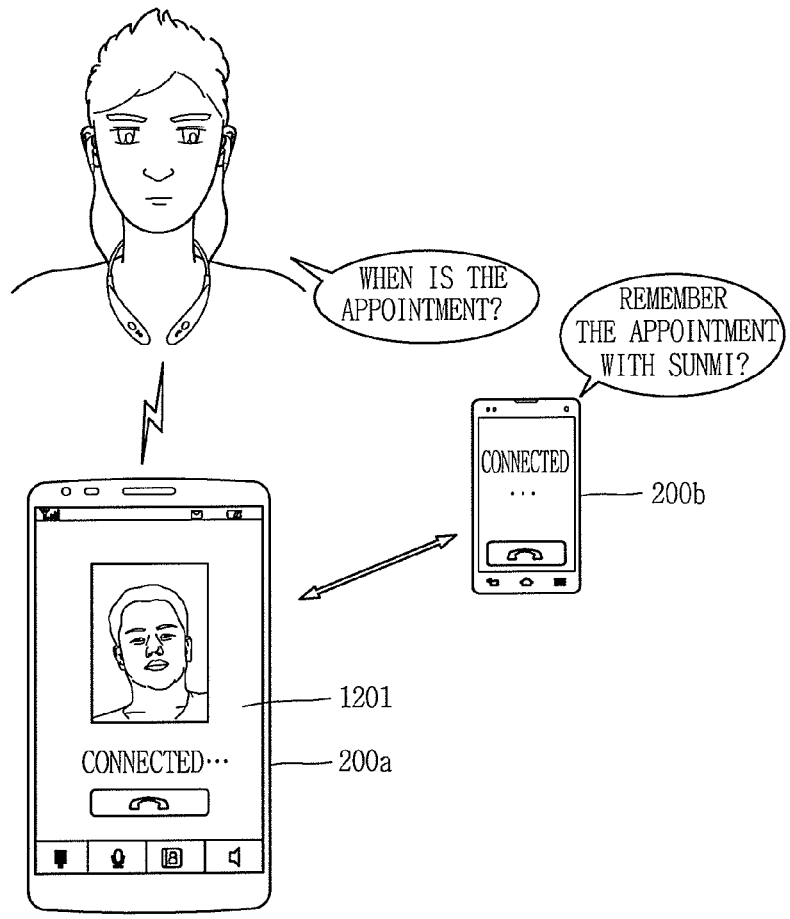
Figure 12B:
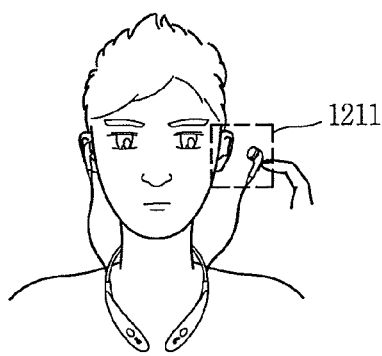
Figure 12C:
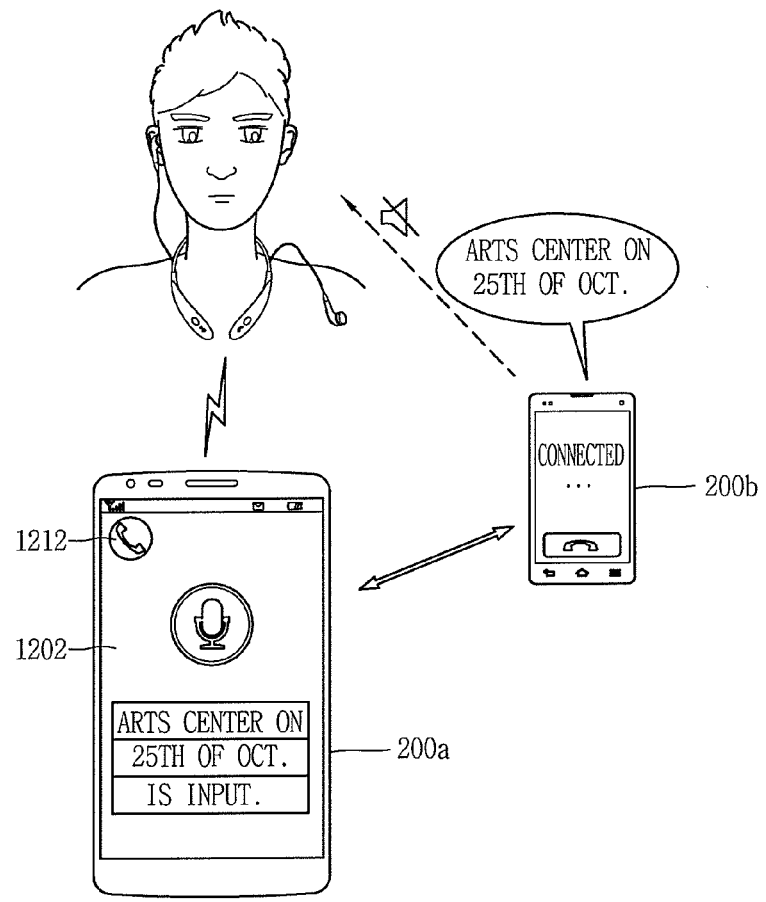

As illustrated in FIG. 12A, during the call with the counterpart through the earphones 31, when the counterpart knows information which the user desires to remember (for example, 'appointment with Sunmi'), as illustrated in FIG. 12B, the user separates one earphone 31 with applying a touch input to the one earphone (1211), such that the voice control function can be carried out based on the voice input through the counterpart terminal 200b. Accordingly, as illustrated in FIG. 12C, the user's voice input through the microphone 52 is transferred neither to the counterpart terminal 200b nor to the user's mobile terminal 200a. That is, the output path of the user's voice input through the headset 100 is restricted. The voice of the counterpart transferred through the counterpart terminal 200b may be converted into text and the converted text may be output on the display unit of the user's mobile terminal 200a (1202). For example, as illustrated in FIG. 12C, when the counterpart of the call speaks 'Arts center on $25^{th}$ of October,' the controller 80 may recognize the speaking of the counterpart as a control command for inputting information to the mobile terminal 200a. Accordingly, text corresponding to the counterpart's voice, which has been input like "Arts center on $25^{th}$ of October' is input,' may be output on the display unit of the user's mobile terminal 200a, and the text may be automatically input as schedule information in the mobile terminal 200a.

Although not illustrated, in addition to the information input, as aforementioned, the operation of the user's mobile terminal 200a may be directly controlled based on the counterpart's voice. For example, when the counterpart of the call speaks let me know 'Kim's phone number'), the user's mobile terminal 200a may search for 'phone number' of 'Kim' stored in phonebook information, and inform the search result to the counterpart of the call or both of the counterpart of the call and the user. In relation to this, in another exemplary embodiment, an operating range or search range of the mobile terminal performed based on the counterpart's voice may partially be restricted, from the perspective of the protection of the user's personal information. For example, a phone number of a specific person stored in the phonebook may be restricted from being searched for based on the counterpart's voice.

Figure 12D:
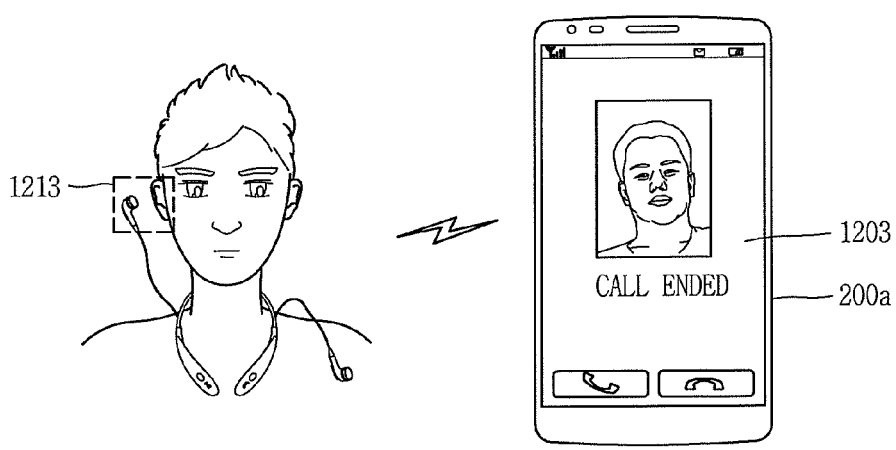
Figure 12E:
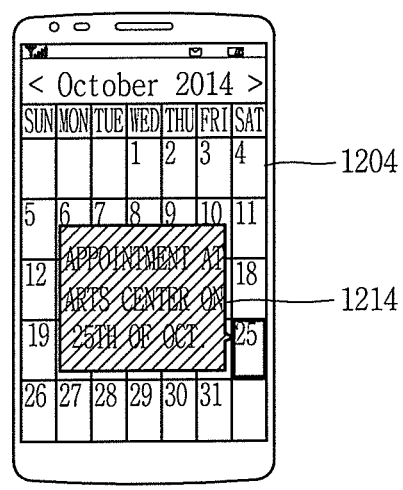

Meanwhile, as illustrated in FIG. 12D, when the other earphone is also separated after one of the plurality of earphones inserted has been separated, the controller 80 may deactivate the voice control function and end the call (1203). When the call is ended, the controller 80 may control the user's voice input during the activation of the voice control function and the corresponding operation result of the mobile terminal to be automatically input to a preset application. Consequently, as illustrated in FIG. 12E, a popup window 1214 indicating an appointed place and time corresponding to 'appointment with Sunmi' may be output on an execution screen 1204 of a calendar application.

Although not illustrated, when 'simultaneously input to both earphones' is applied during a call using the earphones, an audio signal of a preset application or an audio signal of an application which has been executed just before the call reception may be output through the earphones and/or to the counterpart terminal while the call is connected (on-hold state). For example, upon receiving a call while listening to music through the earphones, counterpart information corresponding to the call may be checked by applying pressure to one earphone. Then, when the user separates the other earphone and immediately inserts the other earphone back into the ear, the currently-played music is paused and the call is connected. Under this state, when the user desires for the counterpart to hear the music in the paused state that the user was hearing before receiving the call, 'simultaneous input to both earphones' may be applied so as to replay the paused music and simultaneously output the replayed music to both of the user's earphones and the counterpart terminal. When 'simultaneous input to both earphones' is applied once more, the replayed music is paused and the call is connected again.

Meanwhile, when 'both earphones separated' is applied after 'simultaneous input to both earphones' is applied during the call using the earphones, the call with the counterpart is ended and a sound source is output through the speaker 35 according to whether or not the earphones 31 have been coupled to the earphone coupling portions 15.

The foregoing description has been given of the various embodiments of controlling the mobile terminal through voice during a one-to-one call. Hereinafter, description will be given in detail of embodiments of processing a case of receiving another call during a one-to-one call and controlling a mobile terminal during a multiparty call.

FIG. 13 is a flowchart illustrating a method of processing another incoming call signal received during a call, using a headset in accordance with the present invention.

First, when a call is received from a connected mobile terminal (S1310), an alarm, for example, sound or vibration which notifies the reception of the call is output through the speaker 35, the earphones 31 or the haptic module 60 of the headset 100. Here, when the earphones 31 of the headset 100 are inserted into both of the user's ears or the earphones 31 have already been inserted, the received call is connected in response to a predetermined pressure applied to the earphones 31 or the user input unit 51, (S1330). Here, when an audio signal is received from the mobile terminal 200 after the earphones 31 are previously inserted, a task corresponding to the audio signal is paused and the call is connected (S1320).

In this manner, when another call is received in the state that the call has been connected with the counterpart in response to the earphones 31 inserted or the predetermined pressure applied (S1330), the controller 80 may control information related to the another call to be output through the earphones 31 with maintaining the connection of the previous call, in response to sensing a reception of a preset input applied to one of the plurality of earphones inserted (S1340).

To this end, a touch sensor for sensing a user's touch input may be provided on an outer side of at least one earphone.

Here, the information related to the another call may be a stored name in case where the counterpart of the another call has been stored in the mobile terminal 200*a*, and be a phone number of the counterpart terminal when the counterpart of the another call has not been stored in the mobile terminal 200*a*.

The controller 80 may decide a direction of the earphone for outputting the information related to the another call as both earphones irrespective of a side in which the preset input has been received, or limit the direction to one earphone in which the preset input has been received. For the latter, insertion/separation of the earphone for performing connection/disconnection of the previous call and the another call, which will be explained later, may be associated with an earphone in which the preset input is received.

Next, when one of the one earphone receiving the preset input and the other earphone is separated from the user's ear (S1350), the controller 80 may maintain the connection of one of the currently-connected previous call and the received another call, and disconnects the other (S1360).

Here, the controller 80, as aforementioned, may decide a call whose connection is maintained, in a manner of associating the direction of the earphone in which the user input has been received with the direction of the earphone to be separated for connection/disconnection of the call. Hereinafter, description will be given later in detail of the operation of the controller 80, with reference to FIGS. 15A to 15C and 16A to 16C.

FIGS. 14A to 14D are exemplary views illustrating in detail the flowchart of FIG. 13.

Figure 14A:
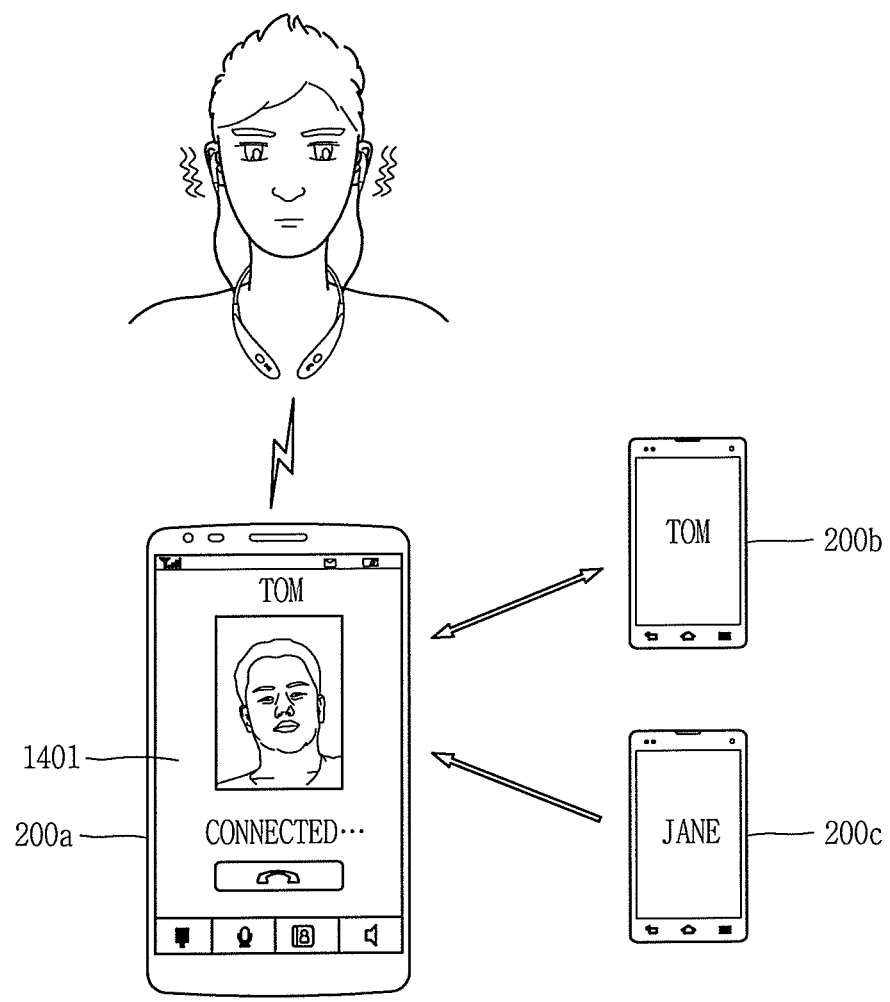

As illustrated in FIG. 14A, when another call signal is received from a second counterpart terminal 200*c* while a call is performed with the first counterpart terminal 200*b*, an audio signal or a vibration signal notifying that the another call signal is currently received may be output through the earphones 31 or the haptic module 60 of the headset 100.

Figure 14B:
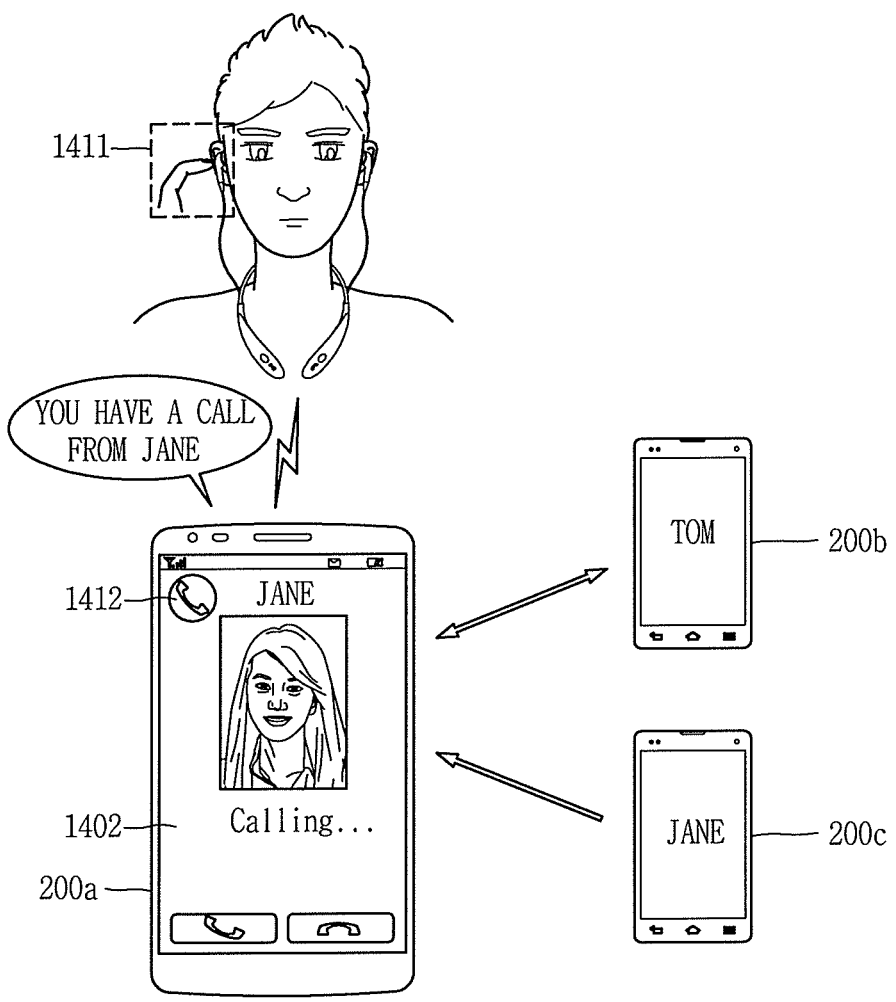

In turn, the user, as illustrated in FIG. 14B, applies a touch input to one earphone (1411), and receives counterpart information (for example, 'Jane') related to the currently-received another call. Here, the counterpart information on the currently-received another call may be output through only one earphone to which the touch input has been applied or simultaneously output through both earphones.

Here, the controller 80 may output information related to the currently-received another call through the earphone to which the touch input has been applied, and restrict an output of audible data corresponding to the previous call. Meanwhile, in another example, when the counterpart information is output through only the one earphone to which the touch input has been applied, the controller 80 may control the counterpart's voice corresponding to the previous call to be kept output through the other earphone. For this, the controller 80 may provide direction information related to the input-received earphone to the mobile terminal 200*a*. In this instance, the mobile terminal 200*a* may control, on the basis of the direction information, the counterpart information corresponding to the another call to be transferred only to the touch input-received earphone, and voice transferred from the counterpart terminal 200*b* corresponding to the previous call to be transferred only to the earphone which has not received an input.

Figure 14C:
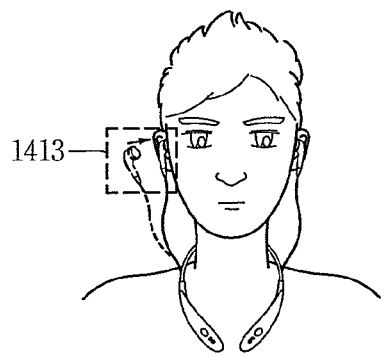
Figure 14D:
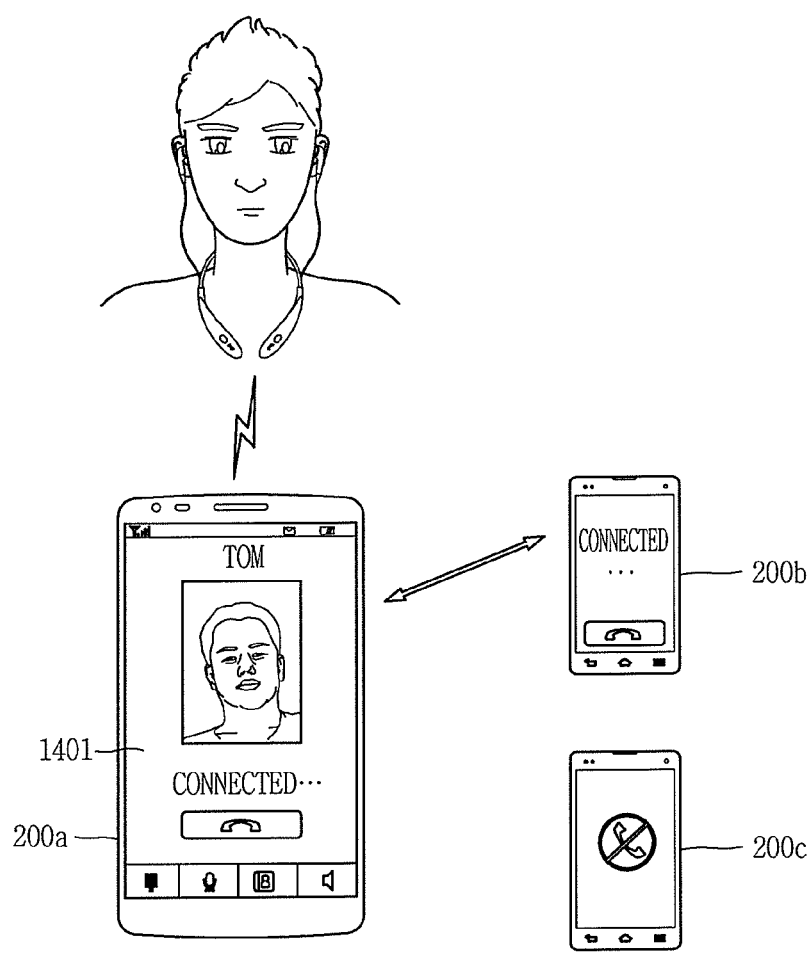

When the user, as illustrated in FIG. 14C, separates the earphone with the touch input applied thereto and then reinserts the same earphone within a predetermined time (for example, 1 to 2 seconds), the call of the first counterpart terminal 200*b*, as illustrated in FIG. 14D, is maintained and the call of the second counterpart terminal 200*c* is refused.

The following Table 2 exemplarily shows a user's operation for processing another call received from the mobile terminal 200*a* during a call or executing another operation during the call, using the earphones coupled to the headset 100.

TABLE 2

| Operation of mobile terminal | | |
|---|---|---|
| User operation for earphones | Earphone state | Receipt of second call |
| One earphone inserted | One inserted, the other not inserted | — |
| Both earphones inserted | Both earphones inserted | — |
| One earphone separated | One inserted, the other not inserted | Refusal of specific counterpart call |
| Both earphones separated | Both earphones not inserted | Call counterpart switchover/call end |
| Input to one earphone | Both inserted + touch input to one earphone | Providing of second counterpart information |
| Input to both earphones | Both inserted + simultaneous touch input to both earphones | One-to-one/multiparty call mode switchover |
| Input to one earphone + separated | One inserted, the other not inserted | refusal of specific counterpart call + message |
| Input to both earphones + separated | Both not inserted | Call end + message |

As shown in Table 2, the controller 80 of the headset 100 may control different operations to be carried out during a call according to cases where one or both of earphones are inserted, one or both of inserted earphones are separated, an input is intentionally applied to one or both of inserted earphones, and one or both of inserted earphones are separated while an input is intentionally applied thereto. The controller 80 may control processing for a call received or a voice control function of the mobile terminal 200 in various manners, by way of an operation of inserting or separating the earphones 31 and/or an operation of applying a touch to the earphones 31 in various touching manners.

To this end, the headset 100 according to one embodiment disclosed herein may include an insertion detecting sensor 41 provided in a unit, which is inserted into the user's ear to output sounds, and configured to sense insertion or separation of the earphone, and a touch sensor 48 provided on an outer side of the unit and configured to sense various touching methods. Here, the touch sensor 48 of the earphone 31 may be formed vertically long to have a predetermined thickness according to the shape of the earphone. The touch sensor 48 of each earphone 31 may have a different shape, color or protrusion structure such that a left side and a right side can be distinctive from each other.

Meanwhile, when 'one earphone inserted/separated and input to one earphone' is sensed, the controller 80 may control different control operations to be carried out by determining which one of the left and right earphones has been inserted/separated/received an input.

For example, the controller 80 may control a control operation associated with a first counterpart to be performed only through the left (or right) earphone, and a control operation associated with a second counterpart to be performed only through the other earphone, for example, the right (or left) earphone. In this instance, prior to performing an operation corresponding to a touch input, the controller 80 may allow the user to check who is the counterpart associated with the control operation (for example, a corresponding counterpart name is output through the touch input-applied earphone 31 or the speaker 35). When the user checks it, the controller 80 may perform the corresponding control operation. For example, upon desiring to perform a function of controlling the operation of the user's terminal based on the first counterpart's voice, when a touch input is applied to the left earphone, counterpart information (for example, the name of the first counterpart) is output through the left earphone. Afterwards, when the other earphone is separated, a function for controlling the operation of the user's terminal based on the voice of the first counterpart is executed. Here, upon desiring to transfer the operation result of the user terminal, which has been executed based on the voice of the first counterpart, to the second counterpart as well, when a touch input is applied to the right earphone, the counterpart information (for example, 'the name of the second counterpart') corresponding to the right earphone is output through the right earphone, and thereafter the operation result of the user terminal is output to the terminal of the second counterpart.

FIGS. 15A to 15C are exemplary views of refusing another call received during a call, and FIGS. 16A to 16C are exemplary views of receiving another call signal received during a call and refusing a previous call.

When the user wants to continue the previous call, as illustrated in FIG. 15A, if an earphone with a touch input applied thereto or an earphone in a predetermined direction (for example, a right earphone) is separated, the controller 80 controls the previous call to be continuously connected and the another call to be refused.

That is, as illustrated in FIG. 15B, the connection of the previous call may be switched into an on-hold state (here, the mobile terminal 200*a* of the user displays an icon 1512 indicating the on-hold state of the previous call), and a function for transmitting a receipt refusal message may be activated on the counterpart terminal 200*c* corresponding to the another call. Afterwards, when the separated earphone is reinserted (1513), the on-hold state of the previous call is switched into a call-available state.

Meanwhile, when the user desires to connect a later call, as illustrated in FIG. 16A, if an earphone opposite to a touch input-received earphone or in a predetermined direction (for example, a left earphone) is separated, the controller 80 may control the another call to be connected and the previous call to be disconnected. That is, as illustrated in FIG. 16A, the connection of the another call may be switched into an on-hold state (here, the mobile terminal 200*a* of the user displays an icon 1612 indicating the on-hold state of the another call), and a function for transmitting a call end message (e.g., 'I'll call you later') may be activated on the counterpart terminal 200*c* corresponding to the previous call. Afterwards, when the separated earphone is reinserted (1613) as illustrated in FIG. 16B, the on-hold state of the another call is switched into the call-available state and the previous call is ended.

FIGS. 17A and 17B are exemplary views illustrating a method of connecting a previous call and another incoming call of counterpart terminals in an alternating manner, using a headset in accordance with the present invention.

When the plurality of earphones are simultaneously separated and thereafter simultaneously reinserted within a reference time during a call (1711), the controller 80 may control the connection of the previous call to be switched into an on-hold state and only the another call to be connected. Accordingly, as illustrated in FIG. 17A, the mobile terminal 200*a* of the user displays a screen 1701 indicating that a call of a first counterpart is currently connected and a call of a second counterpart is on hold. Here, counterpart information on the previous call may be output on an upper part of the screen 1701 and counterpart information on the currently-connected call may be output by applying a highlighting effect, for example, being shaded or darkened.

Under this state, when the plurality of earphones are simultaneously separated and thereafter simultaneously reinserted within the reference time during the call (1712), the controller 80 may connect only the previous call with switching the lately-received call into the on-hold state. Accordingly, as illustrated in FIG. 17B, the mobile terminal 200*a* of the user may display a screen 1702 indicating that the call of the first counterpart is in the on-hold state and the call of the second counterpart is currently connected.

Here, the case where the plurality of earphones are 'simultaneously' separated and then 'simultaneously' reinserted, as aforementioned, may include a case whether units provided in the earphones 31 to output sounds to the user's ears are inserted into and separated from the user's left and right ears at the same time point, and a case where the insertion and separation of the units are sequentially carried out within a predetermined time (for example, 1 to 2 seconds). Also, the controller 80 may control the earphones to be recognized as being 'simultaneously' inserted and separated under a condition that touch inputs applied to the touch sensors 48 provided on the outer sides of the earphones 31 are maintained, respectively. Here, taking into account that the user has one earphone fallen by mistake, even when the touches are sensed by the touch sensors 48 and continuously the insertion/separation of the earphones are performed within a predetermined time (for example, 1 to 2 seconds), the earphones may be recognized as being 'simultaneously' inserted and separated.

According to the aforementioned embodiments, calls can alternately be performed with a plurality of counterparts as many times as desired without directly manipulating the mobile terminal 200*a*.

FIGS. 18A and 18B are conceptual views illustrating a method of performing a multiparty call using a headset in accordance with the present invention.

When another call is received from a second counterpart while a call from a first counterpart is connected through the earphones 31, the controller 80 may enter a multiparty call mode by simultaneously connecting the calls from the first counterpart and the second counterpart, in a manner of checking the second counterpart in response to an input applied to one earphone 31 or in a manner of skipping the checking step of the second counterpart and sensing touch inputs (for example, long touch inputs) simultaneously applied to both of the earphones 31.

For example, as illustrated in FIG. 18A, in a state that the call with the first counterpart is in an on-hold state and the call with the second counterpart is currently connected, when touch inputs (for example, long touch inputs) are simultaneously applied to both of the earphones 31 (1811), as illustrated in FIG. 18B, a multiparty call mode, for example, among the user, Tom and Jane may be entered. Accordingly, a user voice input through the microphone 52 can be transferred simultaneously to the first counterpart terminal 200*b* and the second counterpart terminal 200*c* and a direct conversation between the first counterpart and the second counterpart is also enabled. Meanwhile, the user's mobile terminal 200*a* displays a screen 1802 indicating the activation of the multiparty call mode.

In this manner, during the multiparty call, when the touch inputs (for example, long touch inputs) are simultaneously applied to the plurality of earphones again (1811), the controller 80 may terminate the multiparty call mode and control the call mode to be switched into a one-to-one call mode with one of the previous call and the another call. For example, the controller 80 connects a call of a counterpart terminal which has been connected just before entering the multiparty call mode and switches the call of another counterpart terminal into an on-hold state.

In another embodiment, during the multiparty call, when a touch input (for example, single tap) is applied to one of the plurality of earphones 31, the controller 80 may activate a function (voice control function) of controlling the operation of the mobile terminal based on the user's voice input through the microphone 52 while maintaining the multiparty call. In this instance, the user's voice input through the microphone 52 is input only into the mobile terminal 200*a*, and the operation result executed on the mobile terminal 200*a* is output only on the user's earphones. Here, since the multiparty call mode is maintained, the first counterpart and the second counterpart can keep performing the call.

Meanwhile, while or after the operation result executed on the mobile terminal 200*a* is output through the user's earphones 31, when another touch input (for example, double tap) is applied to one of the plurality of earphones 31, the controller 80 may control the operation result of the mobile terminal 200*a* to be output simultaneously to the counterpart terminals corresponding to the multipart call. Also, when the touch input (for example, single tap) is applied again to one of the plurality of earphones 31, the controller 80 may switch the voice control function into a deactivated state and keep performing the multiparty call.

Although not illustrated, in case where another call is received during a one-to-one call or another call/previous call is in an on-hold state, when one earphone is separated with a touch input applied thereto, a call with a specific counterpart (for example, the counterpart of the previous call) is ended and a preset message is automatically transmitted. Also, when both of the earphones are separated with touch inputs applied thereto, respectively, calls with all the counterparts are ended and a preset message is automatically transmitted to each of the counterparts.

Hereinafter, description will be given of exemplary embodiments of controlling an associated operation by inserting/separating the earphones 31 or applying pressure to the earphones 31 while receiving an audio signal received in the mobile terminal 200*a* through the earphones 31, extending the embodiment of the present invention.

FIGS. 19A to 19C are conceptual views exemplarily illustrating a method of automatically controlling an audio signal of a currently-reproduced content, based on an insertion or separation of earphones coupled to a headset in accordance with the present invention.

As illustrated in FIG. 19A, when one earphone is separated while hearing a music content through both earphones (1911), the controller 80 may determine it as a user operation for hearing external sounds, and thus as illustrated in FIG. 19*b*, automatically turn down a volume of the audio signal (music content) output through one earphone. Accordingly, an indicator bar 1912 is popped up on a screen of the mobile terminal 200, in response to the volume adjustment. When the user reinserts the separated earphone after checking the external sounds (1913), as illustrated in FIG. 19C, the controller 80 may adjust the volume of the audio signal output through both of the earphones up to its original volume level. Meanwhile, when a time for which the one earphone has been separated exceeds a reference time or an external sound input through the microphone 52 exceeds a reference value, the controller 80 may adjust the volume of the music content to the least level or pause the currently-reproduced content.

FIGS. 20A to 20C are conceptual views exemplarily illustrating a method of controlling an operation of a music content in a step-by-step manner, based on an insertion or separation of earphones coupled to a headset in accordance with the present invention.

While hearing a music content through both of the earphones, as illustrated in FIG. 20A, when both of the earphones are simultaneously separated (2011), the controller 80 pauses the reproduction of the music content (2012). Afterwards, as illustrated in FIG. 20B, when the user inserts only one earphone (2013), information related to the paused music content (for example, the title of a song to play) is output through the one earphone. As illustrated in FIG. 20C, when the user further inserts the other earphone, the controller 80 reproduces the paused music content again.

FIGS. 21A to 21C are conceptual views illustrating a method of controlling an operation of a mobile terminal on the voice basis during a content reproduction, using a headset in accordance with the present invention.

As illustrated in FIG. 21A, while hearing a music content through both of the earphones, when one of the both earphones is separated (2111) as illustrated in FIG. 21B, a volume is automatically turned down. Under this state, as illustrated in FIG. 21C, when a touch input is applied to an outer side of the other inserted earphone (2113), the voice control function is activated, and an icon 2114 which indicates the presence of the currently-paused music content is displayed on the screen of the mobile terminal 200*a*.

As described above, a headset according to the embodiments of the present invention can be used to input a control command for controlling an operation of a mobile terminal in a novel manner and immediately receive a control result through earphones during a call with a counterpart, thereby immediately acquiring desired information during the call and providing user convenience allowing for free changeover between a voice control mode and a call-available mode. Also, the headset 100 according to the present invention can control the operation of the mobile terminal based on the counterpart's voice or provide the operation result of the mobile terminal directly to the counterpart's terminal during the call, by use of an input applied to the earphones. This may extend a use subject, which operates the mobile terminal during the call, up to the counterpart located at a remote distance.

Further, in accordance with one embodiment of the present disclosure, the aforementioned methods can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal and the control method thereof in the aforesaid embodiments may not be limitedly applied, but such embodiments may be configured by a selective combination of all or part of the embodiments so as to implement many variations.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A headset comprising:
a body to be provided on a user's body;
a wireless communication unit configured to receive a wireless signal from a connected mobile terminal;
a microphone configured to receive audio;
a plurality of earphones to couple to the body, and each of the earphones to be separately provided in a separated position or an inserted position, and to be changeable between the separated position and the inserted position; and
a controller configured to:
provide the audio, received by the microphone, to the mobile terminal while maintaining a connection of a call with the mobile terminal, and
in response to providing a first one of the earphones into the separated position during the call, activate a function of controlling an operation of the mobile terminal based on the provided audio,
wherein in response to providing the first one of the earphones into the inserted position, the controller controls the audio, received at the microphone, to be provided to a counterpart terminal corresponding to the call.

2. The headset of claim 1, wherein in response to activating the function, the controller outputs audible data, through the second one of the earphones, to notify the activation of the function, and
wherein the controller restricts the audio, received during the activation of the function, from being provided to the counterpart terminal corresponding to the call, and the controller controls a result of the operation of the mobile terminal corresponding to the audio to be output at the second one of the earphones.

3. The headset of claim 2, further comprising:
a first input device at a side of the first one of the earphones to receive a touch input; and
a second input device at a side of the second one of the earphones to receive a touch input.

4. The headset of claim 3, wherein the first input device has a different structure than the second input device to distinguish left and right earphones corresponding to the user's ears, respectively.

5. The headset of claim 3, wherein the controller changes a speed of the audible data corresponding to the operation result of the mobile terminal when a touch input is received at the second input unit, while the operation result of the mobile terminal is output at the second one of the earphones, and the operation result corresponds to the audio input during the activation of the function.

6. The headset of claim 3, wherein in response to receiving a touch input at the second input unit during the activation of the function, the controller outputs the audible data corresponding to the operation result in a rewinding manner by a reference section or outputs the recently-output audible data.

7. The headset of claim 3, wherein the controller controls the audible data corresponding to the operation result to be provided to the counterpart terminal corresponding to the call when a touch input is received at the second input unit, while the operation result of the mobile terminal corresponding to the audio, received during the activation of the function, is output at the second one of the earphones.

8. The headset of claim 3, wherein the controller controls the operation result of the mobile terminal to be output simultaneously to the plurality of earphones and the counterpart terminal corresponding to the call, when a preset touch input is received at the input unit of one of the earphones, while the operation result of the mobile terminal corresponding to the audio, received during the activation of the function, is output at the other one of the earphones.

9. The headset of claim 3, wherein after the call with respect to the mobile terminal is connected in response to the plurality of earphones being provided in the inserted position, when one of the plurality of earphones is provided in the separated position with a preset touch input applied thereto, the controller controls the function of controlling the operation of the mobile terminal to be performed based on audio received from the counterpart terminal corresponding to the call.

10. The headset of claim 1, wherein in response to one of the earphones being provided in the inserted position while the other one of the earphones is in the separated position, the controller deactivates the function for controlling the mobile terminal and ends the call.

11. The headset of claim 10, wherein when the call ends, the controller controls the audio, received during the activation of the function, and the operation result of the mobile terminal corresponding to the audio to be output on an execution screen of a preset application.

12. A headset comprising:
a body to be provided on a user's body;
a wireless communication unit configured to receive a wireless signal from a connected mobile terminal;
a microphone configured to receive audio;
a plurality of earphones to couple to the body, and each of the earphones to be separately provided in an inserted position and a separated position, and to be changeable between the inserted position and the separated position; and
a controller configured to receive a preset input at a first one of the plurality of earphones when another call is received while a previous call is connected through the mobile terminal, and in response to receiving the preset input, the controller is to control information related to the another call and to provide information through at least one of the plurality of earphones with maintaining the connection of the previous call,
wherein the controller maintains one of the previous call and the another call and disconnects the other one of the previous call and the another call when one of the earphones is provided in the separated position.

13. The headset of claim 12, wherein in response to receive the preset input at the first one of the earphones that received the preset input, the controller outputs the information related to the another call at the first one of the earphones that received the preset input, and wherein the controller controls audible data corresponding to the previous call to not be output at the first one of the earphones that received the preset input.

14. The headset of claim 12, wherein in response to providing the first one of the earphones in the separated position, the controller controls the connection of the previous call to be maintained and the another call to be refused.

15. The headset of claim 14, wherein in response to providing the first one of the earphones into the separated position, the controller changes the connection of the previous call to an on-hold state and provides a receipt refusal message to a counterpart terminal corresponding to the another call.

16. The headset of claim 12, wherein the controller restricts an output of audible data corresponding to the previous call while the information related to the another call is output through the plurality of earphones, and
wherein the controller connects the another call and disconnects the previous call when the second one of the earphones without the preset input applied thereto is provided in the separated position.

17. The headset of claim 12, wherein while the information related to the another call is output through the plurality of earphones, the controller restricts an output of audible data corresponding to the previous call, and
wherein when the plurality of earphones are simultaneously provided in the separated positions and are thereafter provided in the inserted position within a preset time, the controller connects only the another call by changing the connection of the previous call to an on-hold state.

18. The headset of claim 12, further comprising:
a first input device at a side of one of the earphones to receive a touch input; and
a second input device at a side of one of the earphones to receive a touch input,
wherein in response to simultaneously providing a touch input at each of the first and second input devices, the controller simultaneously connects the previous call and the another call to provide a multiparty call.

19. The headset of claim 18, wherein in response to simultaneously receiving the preset input at each of the first and second input devices during the multiparty call, the controller controls the multiparty call to change to a one-to-one call with one of the previous call and the another call.

20. The headset of claim 18, wherein in response to receiving a first input at one of the earphones during the multiparty call, the controller activates a function of controlling an operation of the mobile terminal based on an audio input at the microphone while maintaining the multiparty call, and
wherein in response to receiving a second input at one of the earphones during the multiparty call, the controller controls the operation result of the mobile terminal corresponding to the audio input to be provided to counterpart terminals corresponding to the multiparty call.

* * * * *